(12) United States Patent
Teplinsky et al.

(10) Patent No.: US 12,487,899 B2
(45) Date of Patent: Dec. 2, 2025

(54) SYSTEM AND METHOD OF ADAPTIVELY ASSIGNING SCENARIO-BASED TESTS TO TEST ASSETS

(71) Applicant: National Instruments Corporation, Austin, TX (US)

(72) Inventors: Shaul Teplinsky, Orinda, CA (US); Kyle Ross Bryson, Austin, TX (US); Stephen Thung, Norman, OK (US); Douglas William Farrell, Austin, TX (US); James C. Nagle, Leander, TX (US); Jeffrey Marcus Monroe, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 598 days.

(21) Appl. No.: 17/985,099

(22) Filed: Nov. 10, 2022

(65) Prior Publication Data

US 2024/0160542 A1    May 16, 2024

(51) Int. Cl.
| | | |
|---|---|---|
| *G06F 11/263* | (2006.01) | |
| *G06F 11/27* | (2006.01) | |
| *G06F 30/20* | (2020.01) | |
| *G06F 30/27* | (2020.01) | |

(52) U.S. Cl.
CPC ............ *G06F 11/263* (2013.01); *G06F 11/27* (2013.01); *G06F 30/20* (2020.01); *G06F 30/27* (2020.01)

(58) Field of Classification Search
CPC ........ G06F 11/263; G06F 11/27; G06F 30/20; G06F 30/27
See application file for complete search history.

(56) References Cited

U.S. PATENT DOCUMENTS

| | | | | |
|---|---|---|---|---|
| 7,539,980 B1 * | 5/2009 | Bailey | ................. | G06F 11/3688 703/22 |
| 8,560,893 B1 * | 10/2013 | Hollander | ............. | G06F 11/263 714/741 |
| 9,514,036 B1 * | 12/2016 | Dusanapudi | ........... | G06N 20/00 |
| 11,138,100 B2 * | 10/2021 | Weiss | .................. | G06F 11/3696 |
| 11,940,793 B1 * | 3/2024 | Kavalar | ................ | B60W 60/00 |
| 2006/0161508 A1 * | 7/2006 | Duffie | .................. | G06F 11/263 706/55 |

(Continued)

*Primary Examiner* — Nha T Nguyen
(74) *Attorney, Agent, or Firm* — Harness, Dickey & Pierce, P.L.C.

(57) ABSTRACT

Techniques for assigning scenario-based tests to test assets are described. In an example, a scenario-based test operable to test a key performance indicator (KPI) of a System Under Test (SUT), a component behavior exhibited by a first component of the SUT, and a scenario characteristic are received. Based on the component behavior and the scenario characteristic, a first plurality of behavior models associated with the component behavior are identified. Based on the scenario characteristic a characteristic value is extracted from the scenario-based test. Each behavior model of the first plurality of behavior models is executed using the characteristic value to generate a first plurality of predicted behavior outcomes. Based on the first plurality of predicted behavior outcomes, a first test asset type from a plurality of test asset types is selected and the scenario-based test is transmitted to a test asset of the first test asset type.

20 Claims, 10 Drawing Sheets

(56) References Cited

U.S. PATENT DOCUMENTS

| | | | | |
|---|---|---|---|---|
| 2011/0270787 | A1* | 11/2011 | Oishi | G06F 30/30 |
| | | | | 707/E17.007 |
| 2015/0302126 | A1* | 10/2015 | Hamid | G06F 3/0484 |
| | | | | 716/136 |
| 2016/0124827 | A1* | 5/2016 | Manoj Gangadhar | G06F 11/36 |
| | | | | 702/182 |
| 2017/0293550 | A1* | 10/2017 | Song | G06F 11/3684 |
| 2020/0240875 | A1* | 7/2020 | Venkateswaran | G01M 99/005 |
| 2022/0019713 | A1* | 1/2022 | Gyllenhammar | |
| | | | | B60W 50/0097 |
| 2024/0017747 | A1* | 1/2024 | Hasenklever | B60W 60/00274 |
| 2024/0354462 | A1* | 10/2024 | Gaffney | G06F 11/3688 |

* cited by examiner

SYSTEM AND METHOD OF ADAPTIVELY ASSIGNING SCENARIO-BASED TESTS TO TEST ASSETS

BACKGROUND OF THE INVENTION

Modern electronics manufacturing and assembly systems may include an ever increasing number of distributed services to perform test and measurement operations. Despite the progress made in the area test to test asset type assignment, there is a need for more dynamic methods and systems for assigning tests to test assets.

SUMMARY OF THE INVENTION

Various embodiments are described related to efficient data movement in an orchestrated distributed measurement application. In some embodiments, a method of assigning scenario-based tests to test assets is described. The method may comprise receiving a scenario-based test operable to test a key performance indicator (KPI) of a System Under Test (SUT). The method may further comprise receiving a component behavior exhibited by a first component of the SUT during testing of the SUT, wherein the SUT includes a plurality of components comprising the first component. The method may further comprise receiving a scenario characteristic, wherein the component behavior is a function of the scenario characteristic. The method may further comprise identifying, based on the component behavior and the scenario characteristic, a first plurality of behavior models associated with the component behavior, wherein each behavior model of the first plurality of behavior models is associated with a corresponding test asset type of a plurality of test asset types. The method may further comprise extracting, from the scenario-based test and based on the scenario characteristic, a characteristic value of the scenario characteristic. The method may further comprise executing each behavior model of the first plurality of behavior models using the characteristic value to generate a first plurality of predicted behavior outcomes, wherein each predicted behavior outcome of the first plurality of predicted behavior outcomes is associated with a respective behavior model of the first plurality of behavior models. The method may further comprise selecting a first test asset type from the plurality of test asset types based on the first plurality of predicted behavior outcomes. The method may further comprise transmitting the scenario-based test to a test asset of the first test asset type.

In some embodiments, the scenario-based test comprises a plurality of data fields defined by a scenario description language, and the method further comprises identifying the scenario characteristic from the scenario description language. In some embodiments, the first component exhibits a plurality of component behaviors during testing of the SUT, the plurality of component behaviors comprising the component behavior, and the method further comprises determining that the KPI is a function of the component behavior and selecting the component behavior from the plurality of component behaviors based on the determination. In some embodiments, each component behavior of the plurality of component behaviors is associated with a respective plurality of behavior models, and selecting the test asset type from the plurality of test asset types is further based on executions of the respective plurality of behavior models for each component behavior of the plurality of component behaviors.

In some embodiments, each component of the plurality of components exhibits a respective plurality of component behaviors during operation of the SUT. In some embodiments, a plurality of behavior models are associated with each of the respective plurality of component behaviors. In some embodiments, the method further comprises executing each of the plurality of behavior models associated with each of the respective plurality of behaviors and selecting the test asset type from the plurality of test asset types is further based on the execution of each of the plurality of behavior models.

In some embodiments, the component behavior is a further function of a plurality of scenario characteristics, and each behavior model of the first plurality of behavior models is further executed using each scenario characteristic of the plurality of scenario characteristics. In some embodiments, the plurality of test asset types includes at least one test asset type selected from a model-in-the-loop test asset type, a software-in-the-loop test asset type, or a hardware-in-the-loop test asset type. In some embodiments, each behavior model is further associated with a respective proxy component of the corresponding test asset type and is configured to generate a predicted behavior outcome for the proxy component given the characteristic value.

In some embodiments, the method further comprises executing, by the test asset, the scenario-based test on an SUT proxy and measuring, by the test asset, a KPI outcome for the KPI during execution of the scenario-based test on the SUT proxy. In some embodiments, the method further comprises receiving, from the test asset, an actual behavior outcome exhibited by a proxy component corresponding to the first component of the SUT during an execution of the scenario-based test by the test asset. In some embodiments, the test asset type corresponds with a first behavior model of the first plurality of behavior models, and the method further comprises adjusting the first behavior model based on a difference between the actual behavior outcome and a predicted behavior outcome of the first behavior model generated using the characteristic value.

In some embodiments, selecting the test asset type from the plurality of test asset types is further based on a threshold difference between predicted behavior outcomes, and the method further comprises receiving, from the test asset, a KPI outcome for the KPI measured during an execution of the scenario-based test by the test asset The method may further comprise identifying a correlation between the KPI outcome and the component behavior based on the actual behavior outcome exhibited by the proxy component and adjusting the threshold difference based on the identified correlation between the KPI outcome and the component behavior.

In some embodiments, an adaptive test assignment system is described. The system may comprise one or more processors and one or more memories storing computer-readable instructions that, upon execution by the one or more processors, configure the computer system to receive a scenario-based test operable to test a key performance indicator (KPI) of a System Under Test (SUT). The instructions may further configure the computer system to receive a component behavior exhibited by a first component of the SUT during testing of the SUT, wherein the SUT includes a plurality of components comprising the first component. The instructions may further configure the computer system to receive a scenario characteristic, wherein the component behavior is a function of the scenario characteristic. The instructions may further configure the computer system to identify, based on the component behavior and the scenario characteristic, a first plurality of behavior models associated with the component behavior, wherein each behavior model of the first plurality of behavior models is associated with a corresponding test asset type of a plurality of test asset types. The instructions may further configure the computer system to extract, from the scenario-based test and based on the scenario characteristic, a characteristic value of the scenario characteristic. The instructions may further configure the computer system to execute each behavior model of the first plurality of behavior models using the characteristic value to generate a first plurality of predicted behavior outcomes, wherein each predicted behavior outcome of the first plurality of predicted behavior outcomes is associated with a respective behavior model of the first plurality of behavior models. The instructions may further configure the computer system to select a first test asset type from the plurality of test asset types based on the first plurality of predicted behavior outcomes. The instructions may further configure the computer system to transmit the scenario-based test to a test asset of the first test asset type.

In some embodiments, the system further comprises a plurality of test assets comprising the test asset and in communication with the one or more processors, wherein each test asset of the plurality of test assets is assigned a respective test asset type from the plurality of test asset types. In some embodiments, in response to receiving the scenario-based test, the test asset is configured to perform operations comprising executing the scenario-based test on an SUT proxy. The operations may further comprise measuring a KPI outcome for the KPI as a result of executing the scenario-based test on the SUT proxy. The operations may further comprise measuring an actual behavior outcome exhibited by a proxy component of the SUT proxy corresponding to the first component of the SUT.

In some embodiments, the system further comprises a plurality of SUT proxies comprising the SUT proxy, wherein each SUT proxy of the plurality of SUT proxies is assigned to a respective test asset of the plurality of test assets. In some embodiments, the system further comprises a communication network communicatively connecting the one or more processors to the plurality of test assets, wherein the one or more processors and the plurality of test assets are located in different geographic locations.

In some embodiments, one or more non-transitory computer-readable storage media are described. The one or more non-transitory computer-readable storage media may store instructions that, upon execution on a computer system, cause the computer system to perform operations including receiving a scenario-based test operable to test a key performance indicator (KPI) of a System Under Test (SUT). The operations may further include receiving a component behavior exhibited by a first component of the SUT during testing of the SUT, wherein the SUT includes a plurality of components comprising the first component. The operations may further include receiving a scenario characteristic, wherein the component behavior is a function of the scenario characteristic. The operations may further include identifying, based on the component behavior and the scenario characteristic, a first plurality of behavior models associated with the component behavior, wherein each behavior model of the first plurality of behavior models is associated with a corresponding test asset type of a plurality of test asset types. The operations may further include extracting, from the scenario-based test and based on the scenario characteristic, a characteristic value of the scenario characteristic. The operations may further include executing each behavior model of the first plurality of behavior models using the characteristic value to generate a first plurality of predicted behavior outcomes, wherein each predicted behavior outcome of the first plurality of predicted behavior outcomes is associated with a respective behavior model of the first plurality of behavior models. The operations may further include selecting a first test asset type from the plurality of test asset types based on the first plurality of predicted behavior outcomes. The operations may further include transmitting the scenario-based test to a test asset of the first test asset type.

In some embodiments, the first component exhibits a plurality of component behaviors during testing of the SUT, the plurality of component behaviors comprising the component behavior, and the operations further include calculating a correlation coefficient for the KPI and the component behavior and adjusting an importance of the component behavior for subsequent test asset type selections. In some embodiments, each component of the plurality of components exhibits a respective plurality of component behaviors during operation of the SUT. In some embodiments, a plurality of behavior models are associated with each of the respective plurality of component behaviors and the operations further include executing each of the plurality of behavior models associated with each of the respective plurality of behaviors and selecting the test asset type from the plurality of test asset types is further based on the execution of each of the plurality of behavior models. In some embodiments, the component behavior is a further function of a plurality of scenario characteristics, and each behavior model of the first plurality of behavior models is further executed using each scenario characteristic of the plurality of scenario characteristics.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF SPECIFIC EMBODIMENTS

Figure 1:
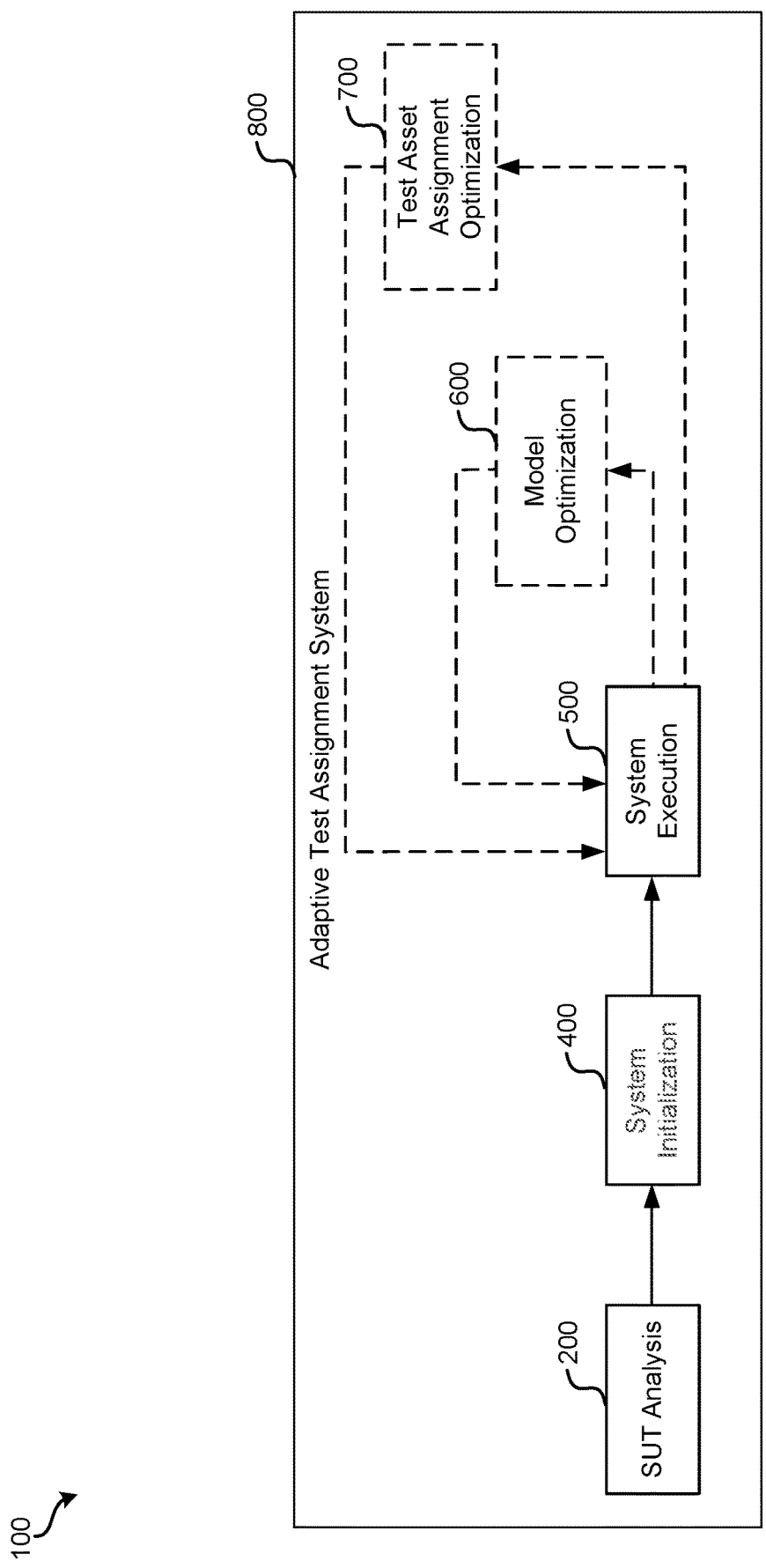
FIG. 1 illustrates the flow of data within an adaptive test assignment system according to some embodiments.

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Certain embodiments relate to systems and methods for adaptively assigning scenario-based tests to test assets. Scenario-based tests may be used to validate Key Performance Indicators (KPIs) of a functional system under test (SUT) using one or more types of test assets to execute the test on model systems, referred to herein as SUT proxies. In some cases, test asset types are assigned based on analysis of actual or predicted results of a set KPIs given a scenario designed to test the set of KPIs. However, such KPIs may change dramatically throughout the validation of an SUT. In addition, predicting the behavior of a system for each scenario may be technically challenging, time consuming, and error prone. As a result, tests may be assigned to cost ineffective test asset types or less-accurate test-asset types leading to delays in system validation, budget overruns, and the like.

Rather than trying to directly model the results of a set of KPIs given a scenario, embodiments described herein solve these, and other problems by modelling phenomena called SUT behaviors that are both easier to predict in terms of technological feasibility as well as more likely to be accurate predictions. Further still, embodiments described herein reduce the challenges presented by predicting SUT behaviors across multiple test asset types by approximating the SUT behaviors during test using predicted behaviors of individual SUT components given a scenario. Leveraging a combination of domain expertise and Artificial Intelligence/Machine Learning (AI/ML) behaviors of SUT components may be selected which are likely to be correlated to KPIs for the SUT. As a result, the assignment of a test to a test asset may be adapted by analyzing the predicted behaviors of the SUT components for a given scenario-based test, as will be further described herein.

Various examples are provided throughout the present disclosure in reference to an automotive Automatic Emergency Braking (AEB) system, and/or one or more components, functions, and behaviors thereof, for which performance is to be measured. However, such examples are used for explanation purposes only and are not intended to limit the applicability of the embodiments described herein. For example, embodiments described herein may be equally applicable to other types of functional systems across a wide range of industries, such as vehicle lane keeping assist systems, aircraft autopilot systems, cognitive radar systems, and the like.

FIG. 1 illustrates the flow of data 100 within an adaptive test assignment system 800 according to some embodiments. Flow of data 100 within adaptive test assignment system 800 may include SUT analysis 200 as further described in relation to FIG. 2 and FIG. 3, system initialization 400 as further described in relation to FIG. 4, and system execution 500 as further described in relation to FIG. 5. As indicated by the dashed lines and boxes, flow of data 100 may optionally include model optimization 600 as further described in relation to FIG. 6, and test asset assignment optimization 700 as further described in relation to FIG. 7. In some embodiments, SUT analysis 200 and/or system initialization 400 are performed once for a particular SUT while system execution 500, and optionally model optimization 600 and/or behavior importance optimization 600, may be repeated as necessary to assign tests to test asset types, as described further herein.

Figure 2:
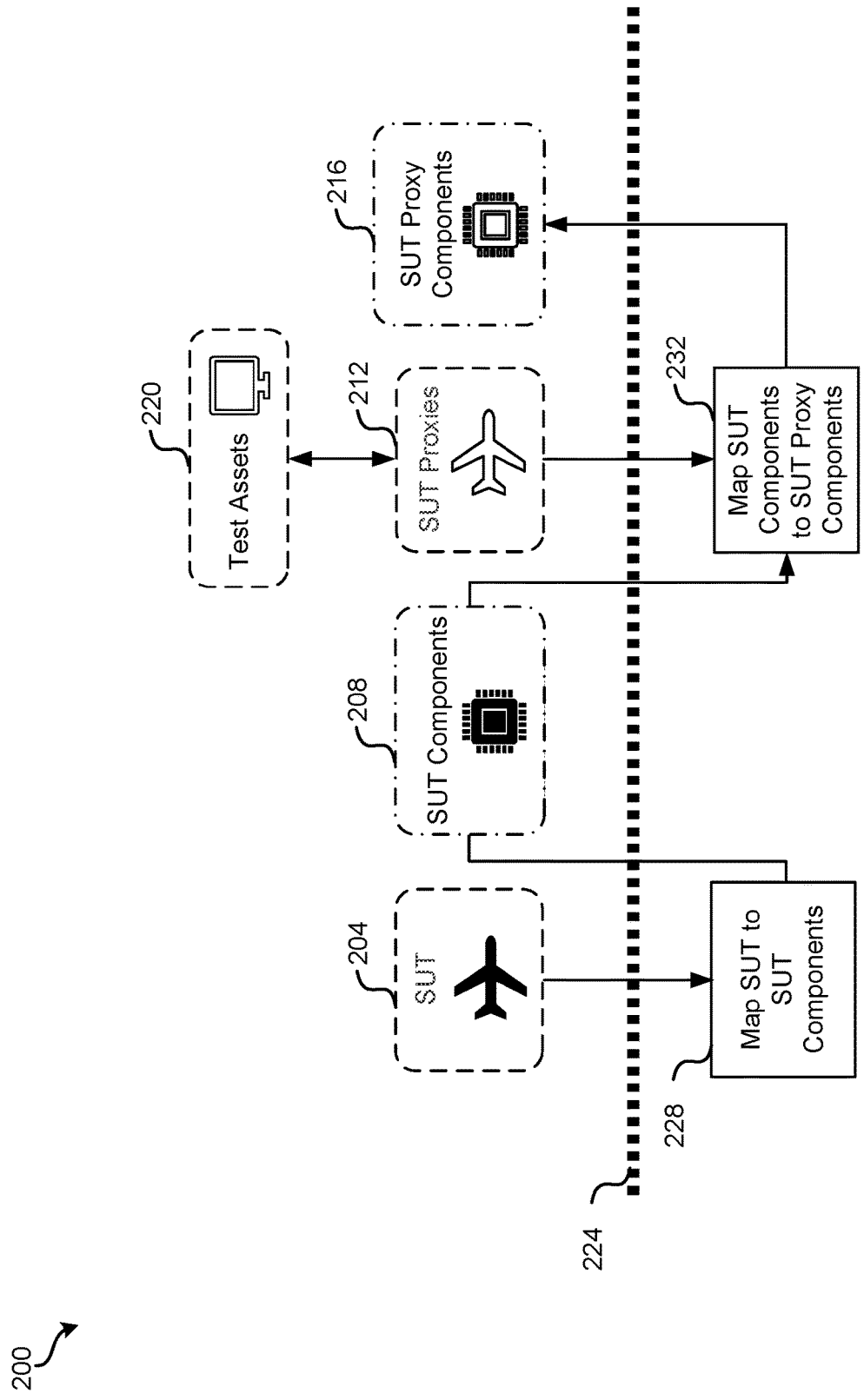
FIG. 2 illustrates SUT analysis in an adaptive test assignment system according to some embodiments.

FIG. 2 illustrates SUT analysis 200 in an adaptive test assignment system according to some embodiments. Broadly speaking, SUT analysis 200 includes steps associated with identifying and/or defining the functional system whose performance is to be measured during testing, e.g., SUT 204, as well as the functional systems whose behaviors under test are meant to model the behavior of the true functional system, e.g., SUT proxies 212. As illustrated in FIG. 2, information above dotted line 224 may be, and in some cases must be, provided as inputs to SUT analysis 200. For example, items enclosed by dashed lines, such as SUT 204, SUT proxies 212, and test assets 220, may represent the initial information necessary to perform SUT analysis 200. On the other hand, items enclosed by dot-dashed lines, such as SUT components 208 and SUT proxy components 216, may represent information that may be obtained as a result of SUT analysis 200, for instance by performing the steps illustrated below dotted line 224.

In some embodiments, Key Performance Indicators (KPIs) are the measure by which performance of a functional system is measured. KPIs may express a wide range of desired qualities, such as safety, power efficiency, reliability, accuracy, and the like. In the automotive space in particular, KPIs may focus on the operational safety of a vehicle and/or the adherence to traffic laws. KPIs may include one or more standards for acceptable operating results produced by the functional system for which they are defined. Returning to the automotive space, such standards may include values or thresholds related to an acceptable mean-time-to-collision, an acceptable number of offroad incidents, an acceptable number of traffic violations, whether or not there was a collision, and the like. For example, KPIs associated with evaluating the safety of an AEB system may express a first KPI related to stopping distance as a minimum acceptable distance from the AEB system to another object (e.g., vehicle, pedestrian, building, etc.) once the AEB system has come to a stop as a result of being engaged. In this example, the system may be considered to have failed the first KPI if the stopping distance is less than the predefined acceptable minimum distance, such as less than 10 ft., 5 ft., 3 ft., or another suitable distance to ensure occupant safety.

At block 228, SUT analysis 200 may include one or more steps associated with mapping a particular functional system, e.g., SUT 204, to its component parts, e.g., SUT components 208. An SUT component may be one of a plurality of elements that make up the functional system. For example, an AEB system may include multiple components, such as a radar sensor, a camera, a braking control unit, wiring, mechanical fixtures, a user interface, and the like.

Figure 3:
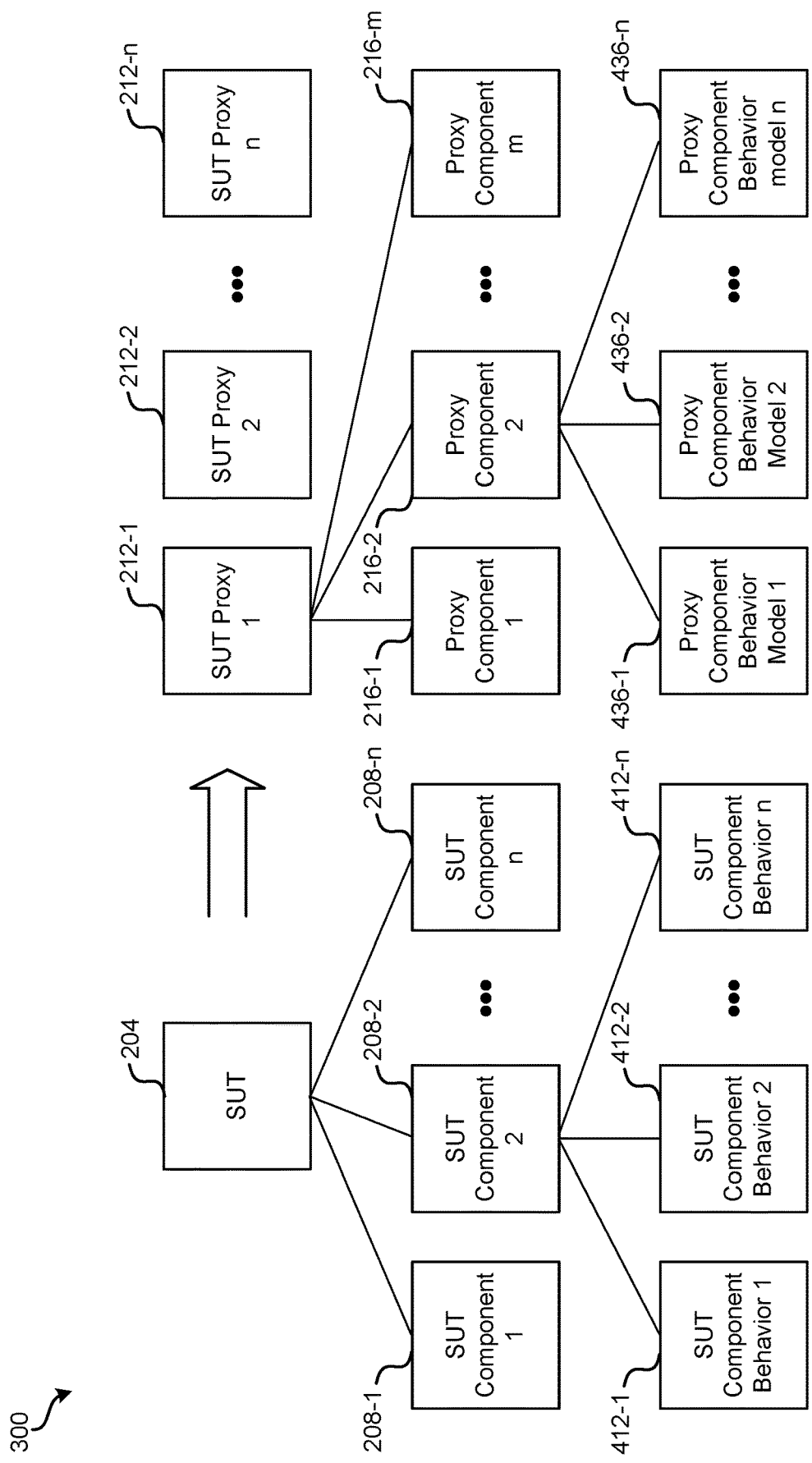
FIG. 3 illustrates an exemplary mapping of an SUT comprising multiple SUT components to multiple SUT proxies according to some embodiments.

FIG. 3 illustrates an exemplary mapping 300 of SUT 204 comprising multiple SUT components 208 according to some embodiments. As illustrated, SUT 204 may comprise any suitable number "n" of SUT components 208 from first SUT component 208-1 and second SUT component 208-2 through $n^{th}$ SUT component 208-n.

Among the possible plurality of SUT components 208, some SUT components 208 may be likely to have an impact on one or more KPIs defined for SUT 204, while other SUT components 208 may be unlikely to have an impact on KPIs. Stated differently, the end results of a KPI may be a function of one or more SUT components 208. Additionally, or alternatively, a first unique subset of SUT components 208 may have an impact on a corresponding first subset of KPIs and not a second subset of KPIs, while a second unique subset of SUT components 208 may have an impact on the second subset of KPIs and not the first subset of KPIs.

In some embodiments, SUT 204 is analyzed to determine which SUT components 208 are likely to have an impact on KPIs. That is to say, SUT components 208 may be selected from a superset of SUT components identified for SUT 204 based on their likelihood of impacting one or more KPIs defined for SUT 204. For example, considering the possible components of an AEB system as described above, it may be determined that the sensors generate the information used by the AEB to decide to engage the brakes. In particular, the radar sensor may detect the relative position and velocity of actors such as other cars and pedestrians which may necessitate braking. Further, it may be determined that braking at the appropriate time may affect many potential KPIs, such as a KPI associated with stopping time and/or distance. Thus, it may be determined that the radar sensor is likely to have an impact on KPIs. Subsequent determinations may further identify the camera and the braking control unit as being likely to have an impact on KPIs. On the other hand, it may be determined that the wiring, mechanical fixtures, and user interface may be unlikely to have an impact on KPIs.

In some embodiments, identifying SUT components 208 that are likely to have an impact on KPIs may be performed by one or more domain experts. Additionally, or alternatively, the selection may be performed by an automated, or semi-automated system. For example, one or more Artificial Intelligence/Machine Learning (AI/ML) models may be trained to generate a likelihood of a particular SUT component having an impact on KPIs. In some embodiments, SUT components 208 are selected based on their associated likelihood of having an impact on KPIs. For example, the likelihood of having an impact may be compared against one or more threshold criteria such as the number of KPIs likely to be impacted, the relative importance of the impacted KPIs, the relative likelihood as compared with other likelihoods, and the like.

SUT analysis 200 may further include one or more steps associated with mapping SUT 204 to one or more SUT proxies 212. For example, referring now to FIG. 3, SUT 204 may be mapped to any suitable number "n" of SUT proxies 212 from first SUT proxy 212-1 and second SUT proxy 212-2 through $n^{th}$ SUT proxy **212-*n*. As described above, SUT proxies 212 may be functional systems whose behaviors under test are meant to model the behavior of SUT 204. SUT proxies 212 may be lighter-weight functional systems than SUT 204 in that they may include simplified subsystems. Additionally, or alternatively, an SUT proxy may be the SUT itself, or a copy of the SUT. SUT proxies 212 may be composed of a plurality of physical components, physical models of components, digital twins of physical components, and the like. Additionally, while SUT 204 may be entirely physical, one or more of its corresponding SUT proxies 212** may be entirely digital.

At block 232, SUT analysis 200 may further include one or more steps associated with mapping SUT components 208 to SUT proxy components 216. Similar to SUT components 208 of SUT 204, each SUT proxy of SUT proxies 212 may be made up of a plurality of SUT proxy components 216. Further, each SUT proxy component may correspond to an SUT component of the SUT proxy's corresponding SUT. For example, returning to FIG. 3, first proxy component 216-1 may correspond to first SUT component 208-1 and second proxy component 216-2 may correspond to second SUT component 208-2.

SUT proxy components 216 may range from something as simple as a constant to a complex system, such as an ML model integrated with a custom hardware device. In some embodiments, as an SUT proxy increases in complexity, its SUT proxy components increase in complexity. SUT proxy components 216 may be significantly different than their corresponding SUT components 208. For example, in the context of the AEB system, SUT proxy components corresponding to the radar sensor may include a high-fidelity model of the radar sensor, a digital twin of the radar sensor, or a mathematical model corresponding to the radar sensor's signal processing module.

SUT components 208 and SUT proxies 212 may be analyzed to identify which SUT proxy components of each SUT proxy correspond to each SUT component of SUT 204. In some embodiments, identifying which SUT proxy components correspond to a particular SUT component may be performed by one or more domain experts. Additionally, or alternatively, the identification may be performed by an automated, or semi-automated system. For example, one or more AI/ML models may be trained to match SUT components with corresponding SUT proxy components.

While each SUT proxy component may correspond to an SUT component, some SUT components may not correspond to an SUT proxy component. For example, as further illustrated in FIG. 3, while SUT 204 may be made up of "n" number of SUT components 208, first SUT proxy 212-1 may be made up of some number "m" of proxy components 216 wherein "n" minus "m" is some number greater than zero. Accordingly, "m" proxy component **216-*m* may correspond to some SUT component other than $n^{th}$ SUT component 208-*n***. In some embodiments, SUT proxy components are selected based on the likelihood of their corresponding SUT component having an impact on KPIs as described above. For example, while a user interface of an AEB system may be identified as a component part, a corresponding SUT proxy component may not be identified based on the determination that the user interface is unlikely to have an impact on KPIs.

KPIs, as described above, may be measured by executing a test scenario, as further described below, on SUT 204. However, given sufficiently complex or dangerous test scenarios, as described further below, executing a test scenario on SUT 204 to measure KPIs or behaviors of SUT 204 may be cost prohibitive, unsafe, and/or technically challenging. In some embodiments, because the behaviors under test of SUT proxies 212 are meant to mirror the behavior of SUT 204 under test, an SUT proxy's measured KPI may be an indirect measure of the true SUT's KPI. Thus, by executing the test scenario on SUT proxies 212, KPI measurements made on SUT proxies 212 may be used to validate SUT 204 based on an assumption that the measurements will mirror the measurements made on SUT 204 given the same, or a similar, test scenario.

Test assets 220 may run scenario-based tests on SUT proxies 212. Each test asset may be a collection of resources configured to run at least one scenario-based test on an SUT proxy. Test assets 220 may further be comprised of many different resources, ranging from simple to complex, purely manual to fully automatic, and the like. Test assets 220 may be classified according to a test asset type, each of which can execute scenario-based tests on a corresponding subset of SUT proxies 212. Exemplary test asset types may include Model-in-the-Loop (MIL), Software-in-the-Loop (SIL), Processor-in-the-Loop (PIL), Hardware-in-the-Loop (HIL), Vehicle-in-the-Loop (VIL), proving grounds, Driver-in-the-Loop (DIL), and the like.

Test assets 220 may be assigned corresponding subsets of SUT proxies 212 based on their respective test asset types. Additionally, or alternatively, test assets 220 may be assigned corresponding subsets of SUT proxies 212 based on the complexity and/or type of components that make up the corresponding subset of SUT proxies 212. For example, in the context of an AEB system, an SUT proxy including a physical copy of the AEB's Electronic Control Unit (ECU) and high-fidelity models of the AEB's sensors may be assigned to a test asset of type HIL. As another example, an SUT proxy including a digital twin of the full AEB system designed to model the full vehicle, AEB ECU, and sensors may be assigned to a test asset of type SIL. In yet a further example, an SUT proxy including a mathematical model of the AEB's main control logic may be assigned to a test asset of type MIL.

In some embodiments, test asset type classifications are based at least in part on the type, complexity, and/or functionalities of the collection of resources typically included in test assets of the particular type. Additionally, or alternatively, test assets may be classified based at least in part on the complexity and/or type of the components that make up the SUT proxies on which the test asset is intended to execute scenario-based tests.

For example, an MTh test asset may include one or more software programs that run on a computer, server, mainframe, or the like. Further, MIL test asset types may test corresponding SUT proxies by passing synthetic inputs to the SUT proxies. For example, in the context of an AEB system, a test asset of type MIL may be a process on a computer running a program that, on-demand, generates data based on a gaussian distribution and feeds the data into an instance of the SUT proxy (e.g., the mathematical model of the AEB's main control logic), which is pre-loaded onto the system. The parameters of the gaussian distribution may be determined by a scenario-based test. For example, the computer may await an HTTP "POST" call with an embedded scenario-based test. When the "POST" call is received, the test asset passes the scenario-based test into the data generation program, which generates and feeds gaussian data into the SUT proxy. During the run of the scenario-based test, the SUT proxy's KPI (e.g., stopping distance) may be measured by callback functions in the program running the SUT proxy.

SIL test assets may be the same, or function in a similar manner, as MIL test assets, albeit with a different subset of SUT proxies which are assumed to be of greater complexity and/or closer to approximating the true SUT than the SUT proxies used by an MIL test asset. For example, in the context of the AEB system, a test asset of type SIL may include a desktop computer running an environmental simulator, such as the CARLA simulator, and pre-loaded with an instance of the SUT proxy (e.g., the digital twin of the AEB system). The computer may await an HTTP "POST" call with an embedded scenario-based test. In response to receiving the "POST" call, the computer may pass the scenario into the simulator's scenario runner. The simulator may then simulate the environment around the digital twin of the AEB system and feed environmental data into the digital twin. The environmental information and the goal actions of the digital twin are determined by the scenario-based test. As the scenario is simulated for the digital twin, the KPI (e.g., the stopping distance) may be measured by one or more simulator plugins.

HIL test asset types may include a mixture of physical and digital systems that may utilize both software assets (e.g., computers, servers, mainframes, and the like) as well as physical connections to an SUT proxy. In some embodiments, HIL test asset types test SUT proxies by passing pre-recorded data (e.g., data collected from previous real-world tests) to the SUT proxy. For example, in the context of the AEB system, a test asset of type HIL may include a testing rig, including a computer with a data store of recorded test drives, each annotated with a scenario description. The test asset may further be pre-loaded with an instance of the SUT proxy (e.g., the physical copy of the AEB's ECU and the high-fidelity models of the AEB's sensors). The computer may await an HTTP "POST" call with an embedded scenario-based test. In response to receiving the "POST" call, the computer selects one of the test drives with a scenario description that most closely matches the received scenario. The test drive may then be replayed into the high-fidelity sensor models. The responses of the sensor models may then be passed to the physical copy of the AEB's ECU. As the test drive is replayed, the KPI (e.g., the stopping distance) may be measured by one or more plugins.

Figure 4:
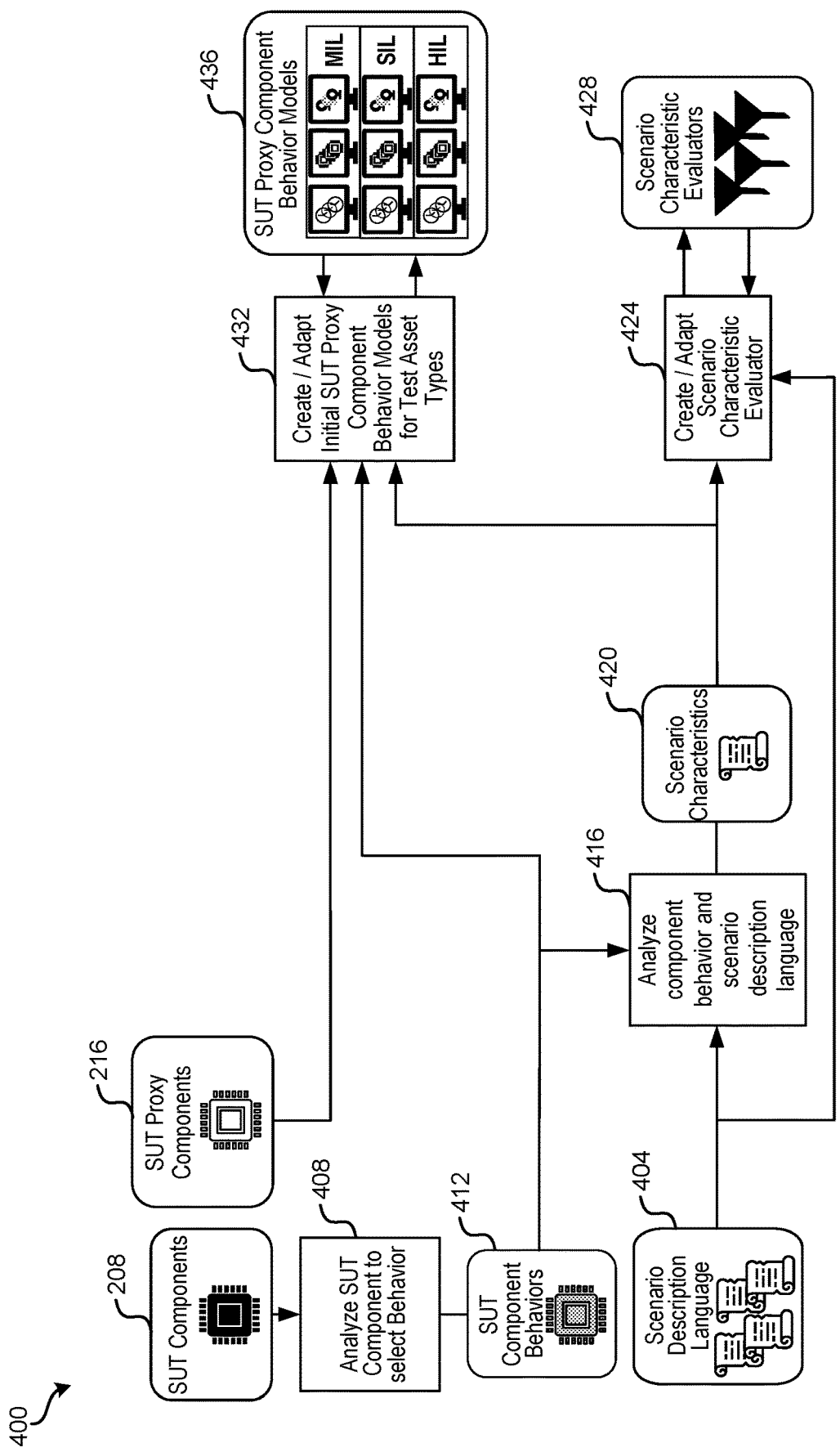
FIG. 4 illustrates system initialization within an adaptive test assignment system according to some embodiments.

FIG. 4 illustrates system initialization 400 within an adaptive test assignment system according to some embodiments. Broadly, system initialization 400 may include steps associated with preparing the adaptive test assignment system for system execution 500. System initialization 400 may accept, as inputs, SUT components 208 and SUT proxy components 216, as described above in relation to FIG. 2. For example, system initialization 400 may receive SUT components 208 and SUT proxy components 216 in response to SUT analysis 200 being completed. Additionally, or alternatively, system initialization 400 may occur concurrently with SUT analysis 200. For example, as SUT components 208 are identified from SUT 204, and corresponding SUT proxy components 216 are identified from SUT proxies 212, they may be transmitted to system initialization 400 for subsequent processing, as described herein.

As illustrated in FIG. 4, system initialization 400 may include one or more processes 408 in which SUT components 208 are analyzed to determine SUT component behaviors 412. An SUT component behavior may be a behavior exhibited by an SUT component while the SUT is active. Each SUT component may exhibit a plurality of SUT component behaviors. For example, as further illustrated in FIG. 3, second SUT component 208-2 may exhibit "n" number of SUT component behaviors 412 from first SUT component behavior 412-1 and second SUT component behavior 412-2 to $n^{th}$ SUT component behavior 412-$n$. As a further example, a radar sensor of an AEB system might exhibit behaviors related to, and/or including, a signal-to-noise ratio (SNR), a maximum number of targets detected, target angular resolution, target range resolution, and the like.

In some embodiments, SUT component behaviors 412 are identified from SUT components 408 based on their ability to be reasonably predicted from scenario characteristics, as further described below, and/or as a result of their being a product of known, explainable phenomena tied to the intrinsic nature of the SUT component. That is to say, while each SUT component may exhibit a plurality of behaviors, only a subset of behaviors may be selected based on their being a product of known, explainable phenomena. For example, in reference to the above behaviors, the maximum number of targets detected may be logically bounded by the number of vehicles and/or pedestrians present in a scenario, as described further below. Additionally, or alternatively, SUT component behaviors 412 may be selected based on their likelihood of having an impact on KPIs. For example, considering a radar sensor, the SNR of the radar sensor may be influential in performing a range of tasks, such as distinguishing one car from multiple cars, or distinguishing a pedestrian from a car. As a result, the SNR of the radar sensor may be identified as a behavior likely to have an impact on one or more KPIs.

In some embodiments, selecting SUT component behaviors 412 is performed by one or more domain experts with an understanding of particular SUT components. Additionally, or alternatively, SUT component behaviors 412 may be selected by an automated, or semi-automated, system. For example, by comparing a particular SUT component to known components of a similar class and their associated behaviors, SUT component behaviors may be identified from the behaviors associated with the known components.

System initialization 400 may further accept scenario description language (SDL) 404 as an input. SDL 404 may be a structured language used to create the scenario-based tests executed by test assets 220 on SUT proxies 212 to measure KPIs, as described further above. Additionally, or alternatively, SDL 404 may be a Domain Specific Language (DSL) including rules and specifications (e.g., a schema) for defining scenario-based tests, as set by one or more accepted standards, such as ASAM OpenSCENARIO®. A scenario may be a "member" of SDL 404 if its structure conforms to the rules and specifications set by SDL 404. Scenarios may describe how the view of the world or scene changes with time, usually from a specific perspective. In the context of vehicles and driving, this may encompass the developing view of both world-fixed elements, such as a road layout and static objects, and world-changing elements, such as vehicles, people, or animals.

Scenarios may provide passive environmental parameters including lighting, weather, pavement type and the like. Scenarios may also provide active environmental parameters such as vehicles and/or pedestrians and their locations, motion, or behavior in the scenario. Scenarios may additionally provide intended behaviors of an SUT and components immediately surrounding it, such as initial speeds of a vehicle containing the SUT (hereinafter the "ego") and prescribed changes in speed at various points throughout the scenario. Through active environmental parameters, a scenario may describe one or more traffic patterns. For example, a scenario may describe a cut-in traffic pattern in which a vehicle in front of the ego but in a different lane merges into the same lane ahead of the ego. As another example, a scenario may describe a cut-out traffic pattern in which a vehicle in front of the ego changes lanes.

System initialization 400 may further include one or more processes 416 in SUT component behaviors 412 and SDL 404 are analyzed to identify scenario characteristics 420 likely to have an impact on SUT component behaviors 412. Scenario characteristics 420 may be pieces of information extractable from a scenario. In some embodiments, scenario characteristics 420 are explicitly or implicitly provided by the information included or excluded in a scenario. Discoverable scenario characteristics may include scenario characteristics 420 that are readily identifiable, or otherwise obvious, from a scenario description. For example, if SDL 404 requires that all vehicles in a scene are treated as sedans unless otherwise specified, the number of sedans in a scene can be discovered by examining a scenario for all vehicle definitions that are either unmarked or are marked as sedans (e.g., by counting vehicle declarations). On the other hand, computable scenario characteristics may include scenario characteristics 420 that may be computed through additional processing of information provided in a scenario description.

In some embodiments, scenario characteristics 420 are identified based on their extractability from scenario definitions. The extractability of a scenario characteristic may be based on SDL 404 itself. For example, by analyzing the rules and specifications defined by SDL 404, it may be determined what information is guaranteed to exist in any given scenario and the process by which it can be extracted. This may include information intrinsic to SDL 404. For example, SDL 404 may not require that the ego vehicle be explicitly included in the text of a scenario description. As such, the number of vehicles present in a scenario could equal the number of vehicle declarations +1. As another example, because the path of a vehicle must be specified in a scenario description, the number of right turns made by the vehicle may be extracted from the path. Additionally, as subsequent SDLs are created as standards, useful scenario characteristics may be already known and be used to seed a pool of possible scenario characteristics. In some embodiments, this analysis may be performed by one or more domain experts. Additionally, or alternatively, an automated process may be used to analyze SDL 404 to identify extractable characteristics.

In some embodiments, scenario characteristics 420 are further analyzed to determine whether they are likely to be predictive of SUT component behaviors 412. A scenario characteristic may be likely to predict SUT component behaviors 412 when it is determined that a particular SUT component behavior is a function of the scenario characteristic. For example, radar SNR may be a function of the number of vehicles in a scenario because, as the number of vehicles in a scene increases, the noise detected by a radar may similarly increase. On the other hand, because radar sensors are typically not sensitive to orientation, or changes in orientation, the number of right turns made by a vehicle may not be likely to predict SNR for the radar sensor.

System initialization 400 may further include one or more processes 424 associated with the creation and/or adaptation of scenario characteristic evaluators 428. A scenario characteristic evaluator may be an automated process which, given a scenario description, discovers or computes the value of a particular scenario characteristic for which the evaluator is defined. For example, a scenario characteristic evaluator defined for a number of vehicles' characteristics may return a number representing the number of vehicles defined in a scenario. In some embodiments, a unique scenario characteristic evaluator is created for each scenario characteristic of scenario characteristics 420.

Scenario characteristic evaluators 428 may include parser-based programs that deconstruct a scenario into a parse tree as specified by SDL 404 and use the parse nodes to extract a particular scenario characteristic. For example, a scenario characteristic evaluator that extracts the time of day may simply return the value of a corresponding declaration node on the parse tree. Additionally, or alternatively, scenario characteristic evaluators 428 may include regex pattern matchers. For example, a scenario characteristic evaluator that extracts weather conditions may look for one or more words, or patterns of words, indicating the weather defined in a scenario, such as the word "snow".

Scenario characteristic evaluators 428 may be stored in an evaluator repository. An exemplary evaluator repository may resemble a basic lookup table program, mapping scenario characteristics 420 to scenario characteristic evaluators 428. In some embodiments, such a repository may be stored on a single computer. Additionally, or alternatively, an evaluator repository may source scenario characteristic evaluators 428 from a large, distributed network.

System initialization 400 may further include one or more processes 432 associated with the creation and/or adaptation of SUT proxy component behavior models 436. Similar to SUT components 208, SUT proxy components 216 may exhibit corresponding behaviors during execution of a test. An SUT proxy component behavior model may be a model configured to accept one or more scenario characteristic values e.g., as extracted by one or more scenario characteristic evaluators 420, and generate an output of a predicted SUT proxy component behavior for a particular SUT proxy component. For example, an SUT proxy component behavior model created for a digital twin of an SUT's radar sensor may accept a value representing the number of vehicles extracted from a scenario, and generate the predicted SNR value that the digital twin would output during execution of the scenario.

SUT proxy component behavior models 436 may range from something as simple as a constant to something like a multiple gigabyte AI/ML model. For example, an SUT component may be a message bus. A first SUT proxy may do no modeling of the message bus. As such its SUT proxy component corresponding to the message bus would implicitly be a constant function. In other words, the bus is assumed to always work with no deviation. Accordingly, the SUT proxy component behavior model would also be a constant function for all inputs. Alternatively, another SUT proxy component may model the bus transmission dynamics and may thus be highly sensitive to its inputs. The corresponding SUT proxy component behavior model might be a deep neural network trained on millions of input-output pairs of the SUT proxy component sourced from many scenario runs on the SUT proxy.

In some embodiments, SUT proxy component behavior models 436 are created for each SUT proxy component of each SUT proxy. Further, for each SUT proxy component, an SUT proxy component behavior model may be created for each SUT component behavior of the corresponding SUT component. For example, as illustrated in FIG. 3, first proxy component behavior model 436-1 may be created to correspond to first SUT component behavior 412-1, second proxy component behavior model 436-2 may be created to correspond to second SUT component behavior 412-2, and so on until $n^{th}$ proxy component behavior model 436-$n$ is created to correspond to $n^{th}$ SUT component behavior 412-$n$.

In some embodiments, SUT proxy component behavior models are contained in a behavior model repository. An exemplary behavior model repository may resemble a lookup table program that maps each SUT component behavior and scenario characteristic tuple to one or more SUT proxy component behaviors. In some embodiments, the behavior model repository will include, for each SUT proxy, an SUT proxy component behavior model created for each SUT component behavior and scenario characteristic tuple. For example, given three SUT proxies, there will be three corresponding SUT proxy component behavior models created for any one SUT component behavior and scenario characteristic tuple.

In some embodiments, the behavior model repository is stored on a single computer. Additionally, or alternatively, in more complex cases, the behavior model repository might process SUT component behavior and scenario characteristic tuples at different times and source an SUT proxy component behavior model from a large, distributed network. SUT proxy component behavior models may be manually selected and/or created. Additionally, or alternatively, an automated process may generate and/or select SUT proxy component behavior models. In some embodiments, the behavior model repository may include a program that, given an SUT component behavior and a scenario characteristic, selects SUT proxy component behavior models from a table—one for each available SUT Proxy, as described above.

SUT proxy component behavior models 436 may be adapted from existing models in a behavior model repository and/or created by a manual, semi-automated, or automated process. While SUT proxy components may vary between projects, some components and test asset types, such as a physical 1080p camera in an HIL environment, may appear multiple times. Known behaviors of such components can provide a baseline for new SUT proxy component behavior models created for similar components and/or scenario characteristics.

Figure 5:
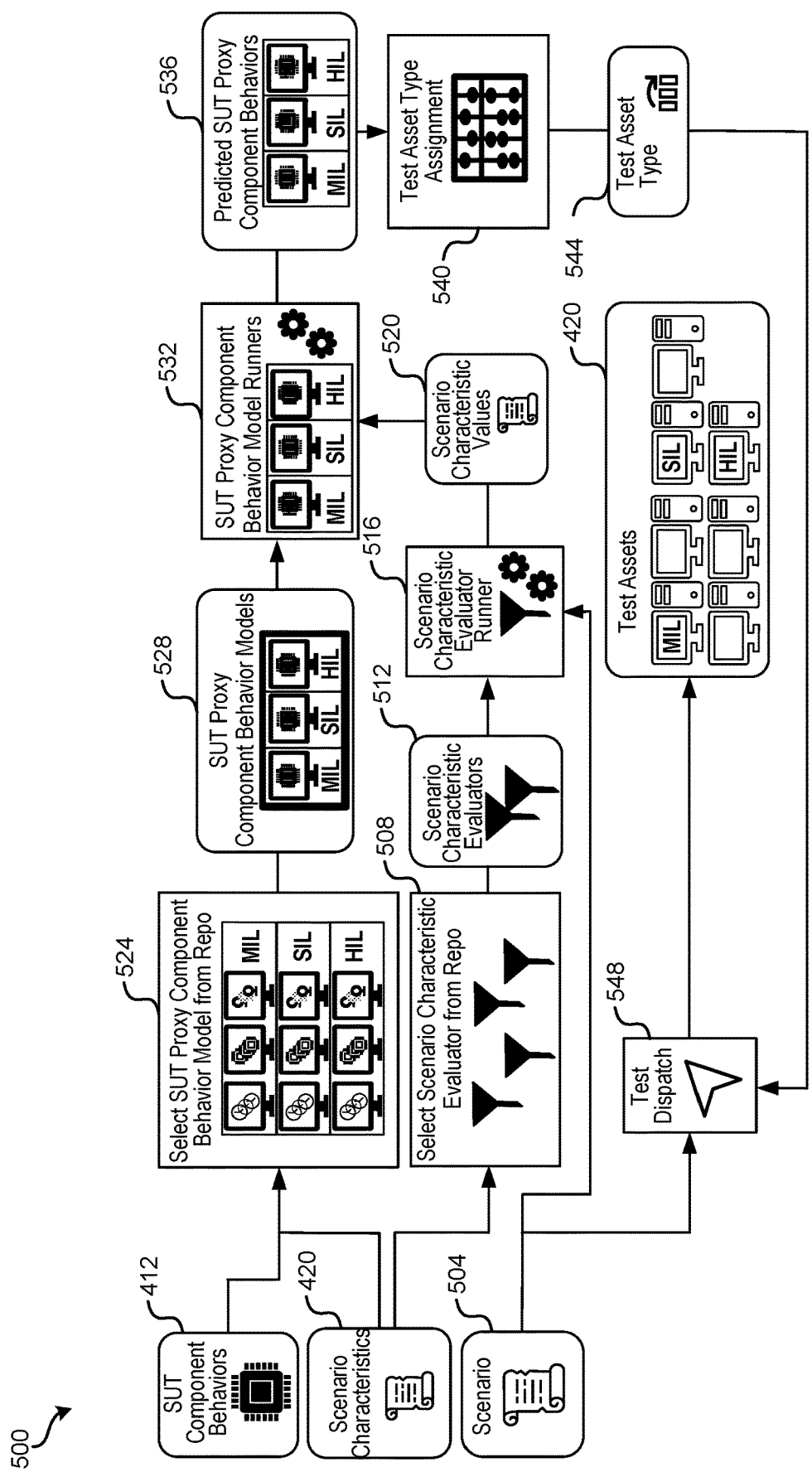
FIG. 5 illustrates the system execution of an adaptive test assignment system according to some embodiments.

FIG. 5 illustrates the system execution 500 of an adaptive test assignment system according to some embodiments. System execution 500 may include the processing performed in order to assign scenario-based test 504 to a test asset for execution on an SUT proxy based on SUT component behaviors 412 of the corresponding SUT and scenario characteristics 420. As described above, scenario-based test 504 may include a description, formatted in accordance with SDL 404 described above, of how the view of the world or scene changes with time, and selected to test one or more KPIs of an SUT, such as SUT 204. As described above in relation to FIG. 1, system execution 500 may be repeated as necessary to assign subsequent scenario-based tests to test assets during validation of an SUT.

System execution 500 may include one or more steps associated with receiving SUT component behaviors 412, scenario characteristics 420, and scenario-based test 504 by the system. Additionally, or alternatively, SUT component behaviors 412, scenario characteristics 420, and/or scenario-based test 504 may be preloaded into the system. For example, after performing system initialization 400, as described above, SUT component behaviors 412 and/or scenario characteristics 420 may be stored in a memory communicatively coupled with the test assignment system. SUT component behaviors 412 and/or scenario characteristics 420 may include the same, or similar, information as described above in relation to FIG. 4. For example, SUT component behaviors 412 may represent a plurality of behaviors exhibited by a corresponding plurality of SUT components that make up an SUT. Alternatively, SUT component behaviors 412 may represent a single behavior of interest exhibited by a particular SUT component of the SUT. Similarly, scenario characteristics 420 may represent one or more categories of information extractable from scenario-based test 504, such as the number of vehicles, the weather, and the like.

At processing block 508, system execution 500 may proceed by selecting scenario characteristic evaluators 512 based on scenario characteristics 420. Scenario characteristic evaluators 512 may be selected from an evaluator repository, as described further above. For example, each scenario characteristic of scenario characteristics 420 may be used as a lookup key or index to select the corresponding scenario characteristic evaluator from the evaluator repository. Depending on the number of scenario characteristics 420 provided during system execution 500, scenario characteristic evaluators 512 may include a subset of scenario characteristic evaluators 428.

Using scenario characteristic evaluators 512 and scenario-based test 504 as inputs, scenario characteristic evaluator runner 516 may extract scenario characteristic values 520 from scenario-based test 504. Scenario characteristic evaluator runner 516 may include one or more systems and/or software programs configured to run scenario characteristic evaluators. Similar to a test asset, scenario characteristic evaluator runner 516 may accept a scenario and a scenario characteristic evaluator and execute the scenario characteristic evaluator, feeding the scenario as an input and yielding the scenario characteristic evaluator's output, e.g., a scenario characteristic value, in some way.

Scenario characteristic evaluator runner 516 may be a command line program that pipes the scenario into an executable scenario characteristic evaluator. Scenario characteristic evaluator runner 516 may further pipe the output of the executable scenario characteristic evaluator to a text file. As scenario characteristic evaluator runner 516 continues to execute scenario characteristic evaluators 512, the subsequent corresponding outputs may be added to the text file. Additionally, or alternatively, scenario characteristic evaluator runner 516 may perform computations on a distributed set of remote machines, each executing one or more scenario characteristic evaluators, by feeding lines of scenario-based test 504 incrementally into the machines and combining the results.

At processing block 524, system execution 500 may proceed by selecting SUT proxy component behavior models 528 based on SUT component behaviors 412 and/or scenario characteristics 420. SUT proxy component behavior models 528 may be selected from a behavior model repository, as described further above. For example, each SUT component behavior of SUT component behaviors 412 and one or more scenario characteristics of scenario characteristics 420 may be used as a lookup key or index to select the corresponding map of SUT proxy component behavior models for each SUT proxy from the behavior model repository. In other words, for each SUT component behavior of SUT component behaviors 412, one SUT proxy component behavior model is selected for each SUT proxy, thereby resulting in a plurality of SUT proxy component behavior models for each SUT component behavior used as a lookup index. SUT proxy component behavior models 528 may function in the same, or a similar, manner as described above in reference to SUT proxy component behavior models 436. For example, each SUT proxy component behavior model of SUT proxy component behavior models 528 may be configured to generate an output of a predicted SUT proxy component behavior of a corresponding SUT proxy component.

Using SUT proxy component behavior models 528 and scenario characteristic values 520 as inputs, SUT proxy component behavior model runners 532 generate predicted SUT proxy component behaviors 536. Each predicted SUT proxy component behavior of SUT proxy component behaviors 536 may be the output generated by a corresponding SUT proxy component behavior model of SUT proxy component behavior models 528 given one or more scenario characteristic values of scenario characteristic values 520. In other words, for each SUT component behavior of SUT component behaviors 412, predicted SUT proxy component behaviors 536 may include a plurality of values, each corresponding to a different SUT proxy. For example, with three SUT proxies (e.g., MIL, SIL, HIL), each configured to model an SNR behavior exhibited by a radar sensor component of an AEB system with a corresponding SUT proxy component, SUT proxy component behavior model runners 532 will generate three predictive values for each of the SUT proxy components, one generated by an MIL SUT proxy component behavior model, one generated by an SIL SUT proxy component behavior model, and one generated by an HIL SUT proxy component behavior model.

The outputs, or predicted values, generated by each SUT proxy component behavior model of SUT proxy component behavior models 528 may be expressed in one or more formats. For example, simple predicted values may be represented by a single real number, or value, such as a percentage, a speed, an acceleration, and the like. Additionally, or alternatively, more complex predicted values may be expressed as a function, such as a probability density function for the speed of a vehicle over the span of a test drive.

An SUT proxy component behavior model runner may be an automated system that runs an SUT proxy component behavior model. SUT proxy component behavior model runners 532 may be consolidated on a single system or may exist across multiple systems. Similar to a test asset, each SUT proxy component behavior model runner may accept a scenario-based test and/or one or more scenario characteristic values extracted from the scenario-based test that are relevant to an SUT proxy component behavior model, and the SUT proxy component behavior model as inputs and execute the SUT proxy component behavior model, feeding the one or more scenario characteristic values as inputs, and yielding the predicted SUT proxy component behavior in some way.

SUT proxy component behavior model runners 532 may include command line programs that pipe the one or more scenario characteristic values into an executable SUT proxy component behavior model. SUT proxy component behavior model runners 532 may further pipe the output of the executable SUT proxy component behavior model to a text file. Additionally, or alternatively, SUT proxy component behavior model runners 532 may load a deep neural network onto a distributed set of remote machine learning accelerators, feed scenario characteristic values incrementally into the accelerators, and combine and print the result.

Using predicted SUT proxy component behaviors 536 as inputs, test asset type assignment 540 may select test asset type 544. Test asset type 544 may indicate the preferred test asset type by which scenario-based test 504 should be executed to validate the SUT. Test asset type 544 may be a single value, such as MIL, SIL, HIL, or another similar value indicating a test asset type, as further described above. Additionally, or alternatively, test asset type 544 may include a ranked list of test asset types. The list of test asset types may further be weighted, such that a larger score for a first test asset type compared with the score for a second test asset type indicates a higher preference for the first test asset type over the second test asset type.

Test asset type assignment 540 may include one or more algorithms configured to optimize the assignment of scenario-based tests to test assets 420 for execution on a corresponding SUT proxy. Test asset type assignment 540 may include one or more logic-based programs (e.g., software applications), configured to compare predicted SUT proxy component behaviors 536 against one or more conditions and/or threshold values. Additionally, or alternatively, test asset type assignment 540 may be configured to perform one or more stochastic analyses on predicted SUT proxy component behaviors 536 and/or apply one or more AI/ML models to predicted SUT proxy component behaviors 536 to optimize the selection of test asset type 544.

Test asset type assignment 540 may be configured to select test assets 420 based on the results of balancing one or more optimization objectives with one or more operational constraints. For example, test asset type assignment 540 may consider optimization objectives including: minimizing execution time amortized across a batch of tests; minimizing monetary cost to execute a batch of tests; minimizing power costs to execute a batch of tests; maximizing utilization of test assets; and the like. Similarly, test asset type assignment 540 may consider operational constraints including: prioritizing tests on high-fidelity test assets that are likely to fail to ensure that the failures are recorded with highly accurate diagnostic information; ensuring that failures are recorded; prioritizing initial test asset type assignments and reducing deviations from default test asset types unless the predicted SUT proxy component behaviors are highly similar between test asset types.

As illustrated above, the optimization performed by test asset type assignment 540 may be generally characterized as attempting to minimize the costs associated with running a test on each test asset type without resulting in a significant change in the KPI results from a more costly test asset type to a less costly test asset type. For example, test asset assignment 540 may encode an algorithm expressed by a rule that if the predicted SUT proxy component behaviors between a lower cost test asset type and the test asset type of highest fidelity are sufficiently similar, then the lower cost test asset type should be chosen.

To illustrate, the system may receive scenario-based test 504 operable to test a KPI of an SUT (e.g., an AEB system). The system may further receive SUT component behaviors 412 including a single SUT component behavior (e.g., SNR) exhibited by a first SUT component (e.g., a radar sensor) of the SUT during testing of the SUT. The system may further receive a scenario characteristic (e.g., number of vehicles defined per scenario). Based on the SUT component behavior and the scenario characteristic, SUT proxy component behavior models 528 may be identified (e.g., by using SNR and number of vehicles as a lookup index tuple in a repository). Each SUT proxy component behavior model may be associated with a corresponding test asset type (e.g., MIL, SIL, and HIL), and be configured to predict a behavior outcome (e.g., an SNR value) for a corresponding SUT proxy component (e.g., an MIL mathematical model, an SIL digital twin, and an HIL high-fidelity model of the radar sensor). Using the number of vehicles extracted from scenario-based test 504, each SUT proxy component behavior model may generate a predicted behavior outcome for a corresponding SUT proxy component (e.g., an MTh value, an SIL value, and an HIL value). Test asset type assignment 540 may then compare the differences between predicted behavior outcomes with a threshold difference to select test asset type 544. For example, if the difference between the HIL value and the SIL value is greater than the threshold difference, test asset type assignment 540 will select test asset type 544 of HIL because doing otherwise will result in an unacceptable loss in fidelity for the test. Alternatively, if the difference between the HIL value and the SIL value is less than the threshold difference, and the difference between the SIL value and the MIL value is also less than the threshold difference, test asset type assignment 540 will select test asset type 544 of MIL, because the MIL test asset type is the lowest cost asset type and performing the test on the MIL test asset type will result in an acceptable level of test result fidelity.

As described herein, test assets of each type may have an associated cost to run a test. As demonstrated above, many of the associated costs are related to time and money, such as test execution time, power consumption of each test asset, personnel and/or facilities needed to facilitate test assets, and the like. In some embodiments, a test asset type cost function accepts a test asset type and yields its corresponding cost. The associated costs may be represented as a scalar value and/or a cost function that takes in one or more parameters, such as the complexity or length of a test, the number of tests to be performed, and the like. Likewise, the associated costs, and/or the differences in cost, may follow a linear pattern, a quadratic pattern, an exponential pattern, and the like.

Test dispatch 548 may in turn determine which test asset type and/or individual test asset will receive scenario-based test 504. Based on test asset type 544 indicating a single value, such as MIL, test dispatch 548 may proceed to select a test asset of type MIL from available MIL type test assets to which scenario-based test 504 will be transmitted for subsequent execution on an SUT proxy. Additionally, or alternatively, based on test asset type 544 indicating a ranked list of test asset types, test dispatch 548 may consider the indicated preferences and/or other factors before transmitting scenario-based test 504 to a test asset. Other factors may include such information as the current load on available test assets of a particular type. In some embodiments, in addition to transmitting scenario-based test 504 to the selected test asset, test dispatch 548 provides the SUT proxy to the selected test asset. This may occur when a selected test asset has not been previously loaded with an SUT proxy.

Figure 6:
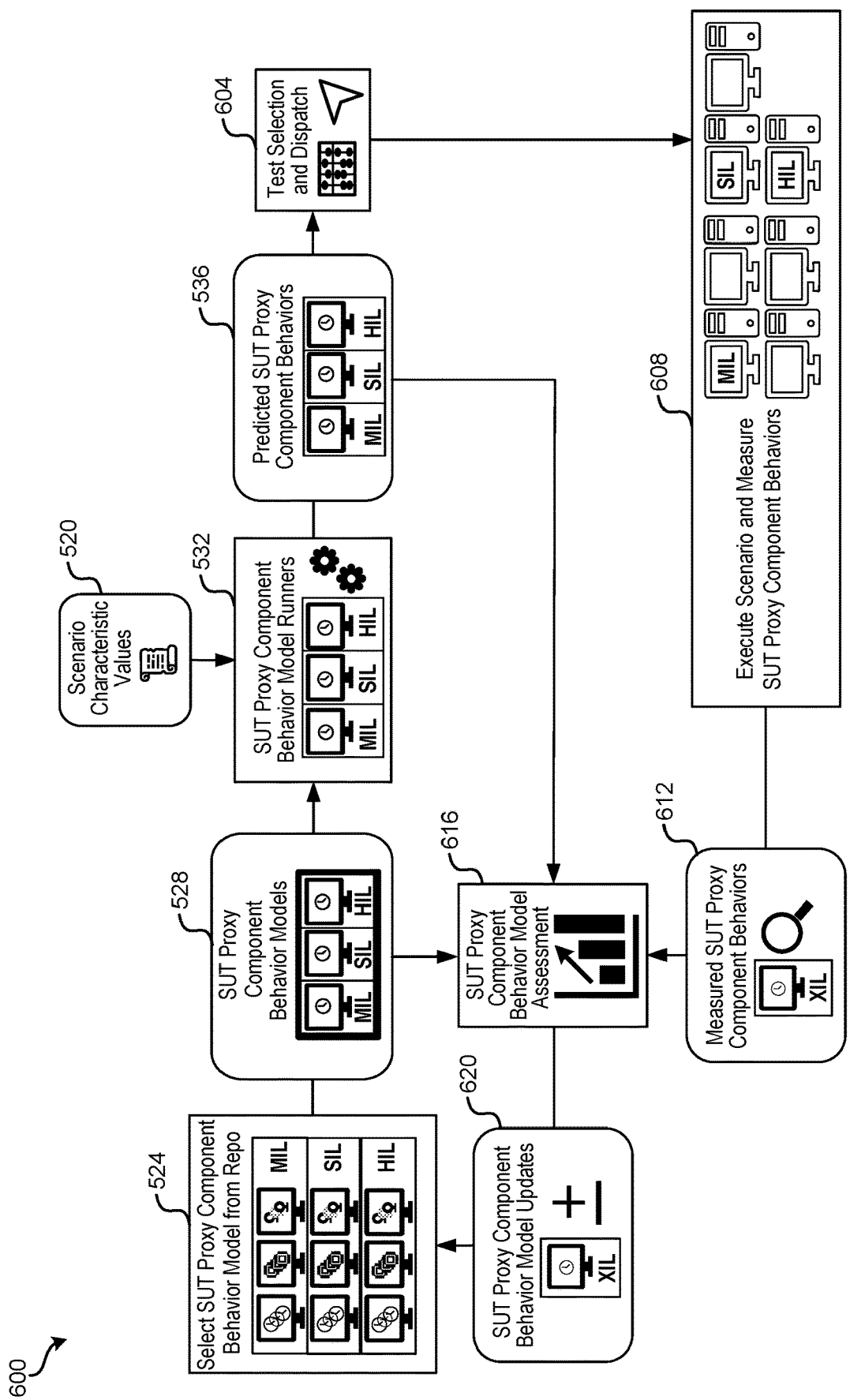
FIG. 6 illustrates SUT component behavior model optimization in an adaptive test assignment system according to some embodiments.

FIG. 6 illustrates SUT component behavior model optimization 600 in an adaptive test assignment system according to some embodiments. Behavior model optimization 600 may include processing to improve the predictive accuracy of SUT Proxy Component Behavior Models over time by comparing the predicted and measured SUT Proxy Component Behavior. As described above in relation to FIG. 1, processing associated with behavior model optimization 600 may be repeated as necessary to improve the predictive accuracy of SUT Proxy Component Behavior Models. For example, one or more processes of behavior model optimization 600 may be performed for each repetition of system execution 500 (e.g., for each new scenario-based test 504).

As illustrated in FIG. 6, behavior model optimization 600 may include, and/or supplement, information and/or processes described above in reference to FIG. 5, such as scenario characteristic values 520, block 524, SUT proxy component behavior models 528, SUT proxy component behavior model runners 532, and predicted SUT proxy component behaviors 536. Similarly, for ease of illustration, test asset type assignment 540, test asset type 544, and test dispatch 548, are illustrated as test selection and dispatch 604. While not illustrated, other information and processing of system execution 500 may similarly be included in behavior model optimization 600, and/or assumed to have been received and performed prior to beginning behavior model optimization 600, such as SUT component behaviors 412, scenario characteristics 420, scenario 504, block 508, scenario characteristic evaluators 512, and scenario characteristic evaluator runner 516.

Accordingly, the additional processing associated with behavior model optimization 600 may begin to be described starting at block 608 wherein execution of scenario-based test 504 by a test asset on an SUT proxy is performed to obtain or receive measured SUT proxy component behaviors 612. Each measured SUT proxy component behavior may represent the actual behavior outcome of an SUT proxy component during execution of scenario-based test 504 by a test asset on an SUT proxy comprising the SUT proxy component. Further, each measured SUT proxy component behavior may correspond to a respective predicted SUT proxy component behavior of predicted SUT proxy component behaviors 536 generated by a corresponding SUT proxy component behavior model of SUT proxy component behavior models 528. As such, measured SUT proxy component behaviors 612 may correspond to a subset of predicted SUT proxy component behaviors 536 generated by SUT proxy component behavior models associated with the same test asset type as the test asset type used to execute scenario-based test 504 on the SUT proxy.

In some embodiments, the nature of execution of scenario-based test 504 will depend on the SUT proxy and test asset to which scenario-based test 504 has been assigned and/or transmitted. Measurement of the actual SUT proxy component behavior may be included in the test asset by default and/or may be implemented as plugins added to support computation of newly defined SUT component behaviors. Further, each test asset may be provided with a different measurement plugin to support the different means by which each test asset executes scenario-based tests. Exemplary plugins and/or test asset modifications may include additional programming to measure the behaviors during simulation and/or post-processing of data recorded from a simulator, such as the vehicle position over time.

At block 616, measured SUT proxy component behaviors 612, predicted SUT proxy component behaviors 536, and SUT proxy component behavior models 528 may be analyzed to produce SUT proxy component behavior model updates 620. SUT proxy component behavior model updates 620 may include one or more pieces of information usable to update one or more SUT proxy component behavior models in a behavior model repository. For example, SUT proxy component behavior model updates 620 may include one or more lookup indices (e.g., SNR, number of vehicles) used to locate the SUT proxy component behavior models in the repository that have been identified for optimization. The information actually used to adjust an SUT proxy component behavior model may vary in complexity dependent on the complexity of the SUT proxy component behavior model. For example, a neural network-based model may require updates to all weights and biases, e.g., a large vector of float values. As another example, a threshold value-based decision model may require a small change to the decision threshold value.

The analysis of block 616 may be performed by a function and/or software program that accepts as inputs an SUT proxy component behavior model, the predicted SUT proxy component behavior generated by the SUT proxy component behavior model, and the measured SUT proxy component behavior from the SUT proxy component for which the SUT proxy component behavior model was generated. The function may proceed to analyze one or more differences between the predicted SUT proxy component behavior and the measured SUT proxy component behavior to determine what, if any, updates to the SUT proxy component behavior model are necessary to better predict future measured SUT proxy component behaviors. In some embodiments, the function is represented by one or more analytical formulas. Additionally, or alternatively, the function may include the use and/or implementation of one or more AI/ML models, such as a neural network.

Figure 7:
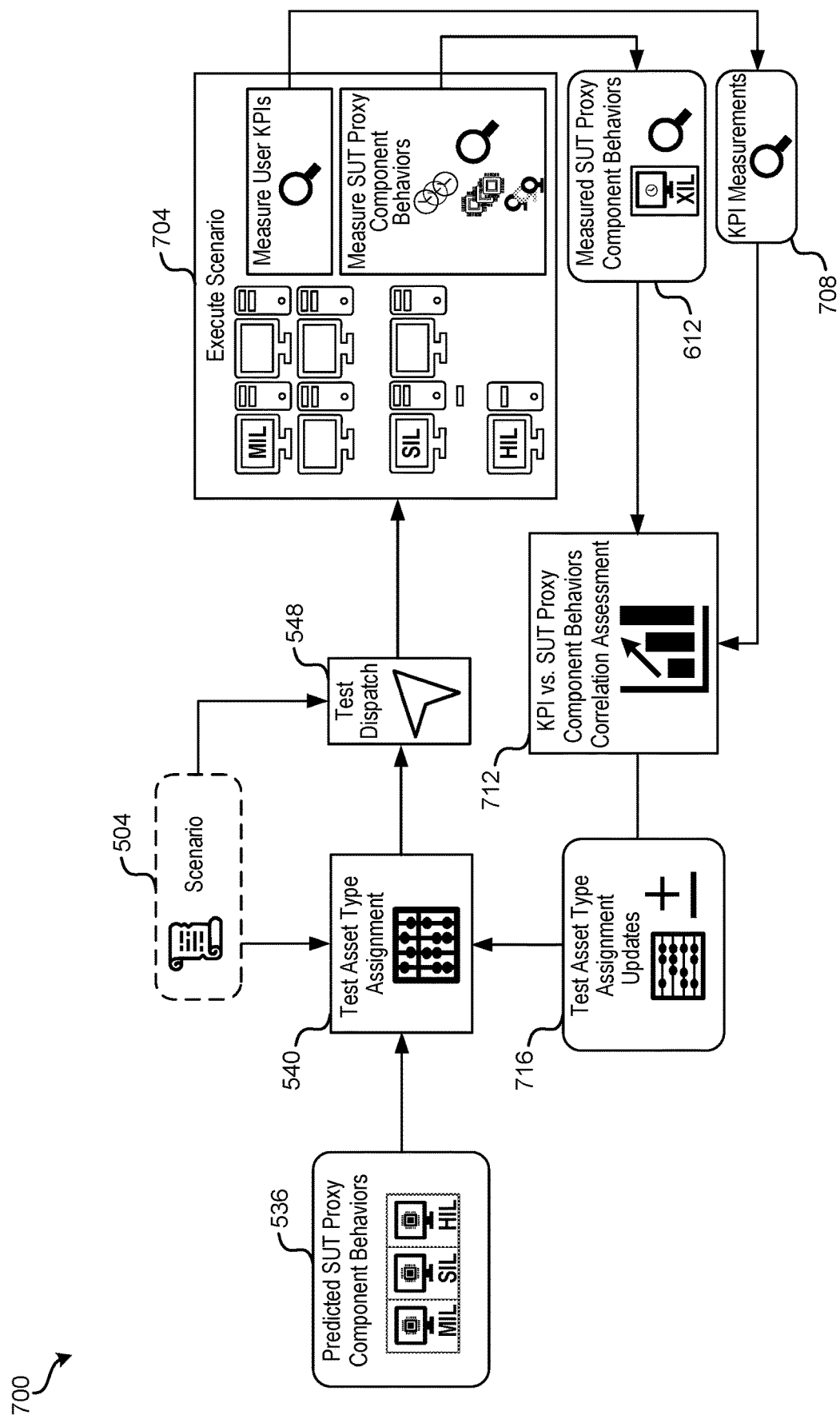
FIG. 7 illustrates test asset assignment optimization in an adaptive test assignment system according to some embodiments.

FIG. 7 illustrates test asset assignment optimization 700 in an adaptive test assignment system according to some embodiments. Test asset assignment optimization 700 may include processing that models the relationship between SUT component and/or SUT proxy component behaviors and KPIs. Modeling the relationship between behaviors and KPIs may allow for greater flexibility in test asset type assignment 540 because the importance of behaviors on the test asset type assignment can be influenced indirectly by the assigned importance of KPIs and the behaviors' relationship to them. As described above in relation to FIG. 1, processing associated with test asset assignment optimization 700 may be repeated as necessary to improve the selection of test asset types and test assets for execution of scenario-based tests.

As illustrated in FIG. 7, test asset assignment optimization 700 may include, and/or supplement, information and/or processes described above in reference to FIG. 5 and FIG. 6, such as scenario-based test 504, predicted SUT proxy component behaviors 536, test asset type assignment 540, test dispatch 548, and measured SUT proxy component behaviors 612. Accordingly, the additional processing associated with test asset assignment optimization 700 may begin to be described starting at block 704 wherein execution of scenario-based test 504 by a test asset on an SUT proxy is performed to obtain or receive measured SUT proxy component behaviors 612 and KPI measurements 708. Measured SUT proxy component behaviors may include the same or similar information and/or be obtained in the same or a similar fashion as described above in relation to FIG. 6.

KPI measurements 708, also referred to herein as KPI outcomes, may include one or more values corresponding to the measured values of a KPI for an SUT proxy as a result of executing scenario-based test 504 by a test asset on the SUT proxy. KPI measurements 708 may be represented as any one, or a combination of, a real number, a complex number, a float value, a binary or Boolean value, a unit of measurement, a vector, and the like. For example, a KPI measurement for a stopping distance KPI may indicate that the stopping distance for an SUT proxy during execution of a scenario-based test was 4 ft. As another example, a KPI outcome for a minimum stopping distance KPI of 3 ft may be a "1" or "True" indicating that the SUT proxy stopped at a greater distance than 3 ft during execution of the scenario-based test and has therefore passed the test.

Similar to the measurement of actual SUT proxy component behaviors described above, measurement of KPI values or outcomes may be included in the test asset by default and/or may be implemented as plugins. Further, each test asset may be provided with a different plugin to support the different means by which each test asset executes scenario-based tests. Exemplary plugins and/or test asset modifications may include additional programming to monitor KPI values or outcomes during simulation and/or post-processing of data recorded from a simulation.

At block 712, measured SUT proxy component behaviors 612 and KPI measurements 708 may be analyzed to produce test asset type assignment updates 716. Test asset type assignment updates 716 may include one or more pieces of information usable to update test asset type assignment 540. For example, a test asset type assignment update may indicate that the threshold difference between predicted SNR values, as described above in relation to test asset type assignment 540, should be decreased from an initial threshold difference to a subsequent threshold difference. The information used to update test asset type assignment 540 may vary in complexity dependent on the complexity of test asset type assignment 540. For example, a large vector of float values may be used to update the weights and biases of a neural network-based assignment algorithm. As another example, a threshold difference-based decision function may be updated by indicating the amount by which the threshold difference should be adjusted.

In some embodiments, test asset type assignment updates 716 are affected by the correlation of SUT proxy component behaviors and KPIs. Additionally, or alternatively, test asset type assignment updates 716 may be affected by the optimization objectives and/or operational constraints considered by test asset type assignment 540, as described further above. For example, an optimization objective might be to reduce the cost of testing by moving tests from test assets of type HIL to test assets of type SIL, but only if a set of KPIs is unlikely to change by a significant amount as a result. However, based on a determination that there is a weak correlation between a behavior and a KPI, or that the KPI is not a function of the behavior, test asset type assignment 540 may be updated to allow the change from HIL to SIL even if the predicted behaviors differ by a large amount (e.g. 90% change). Conversely, based on a determination that there is a strong correlation between the behavior and the KPI, the threshold difference that must be met before allowing the change from HIL to SIL may be greatly reduced.

In some embodiments, the design of test asset type assignment 540 takes the relative importance of KPIs into account when analyzing predicted SUT proxy component behaviors to select a test asset type. For example, it may be determined that a first KPI related to the number of collisions may be of greater importance than a second KPI related to fuel efficiency. As a result, predicted SUT proxy component behaviors having an impact on the first KPI may be given greater weight in the selection of a test asset type compared to predicted SUT proxy component behaviors having an impact on the second KPI. This may in turn result in test asset type assignment updates 716 that place greater weight on the importance of behaviors affecting the first KPI.

The analysis of block 712 may identify correlations between SUT proxy component behaviors and KPIs based on measured SUT proxy component behaviors 612 and KPI measurements 708 collected from a plurality of test executions. For example, block 712 may be performed after 2, 5, 10, or more test executions on data collected from each test execution. Additionally, or alternatively, as each test execution is performed, block 712 may update a correlation coefficient for each unique pair of SUT proxy component behaviors and KPIs. In some embodiments, correlations use the Pearson Correlation Coefficient to evaluate linear relationships between SUT proxy component behaviors and KPIs. Additionally, or alternatively with different variable types, such as categorical variable, the correlation may change. Other non-linear correlations, such as Spearman's rank correlation coefficient, could be used.

Figure 8:
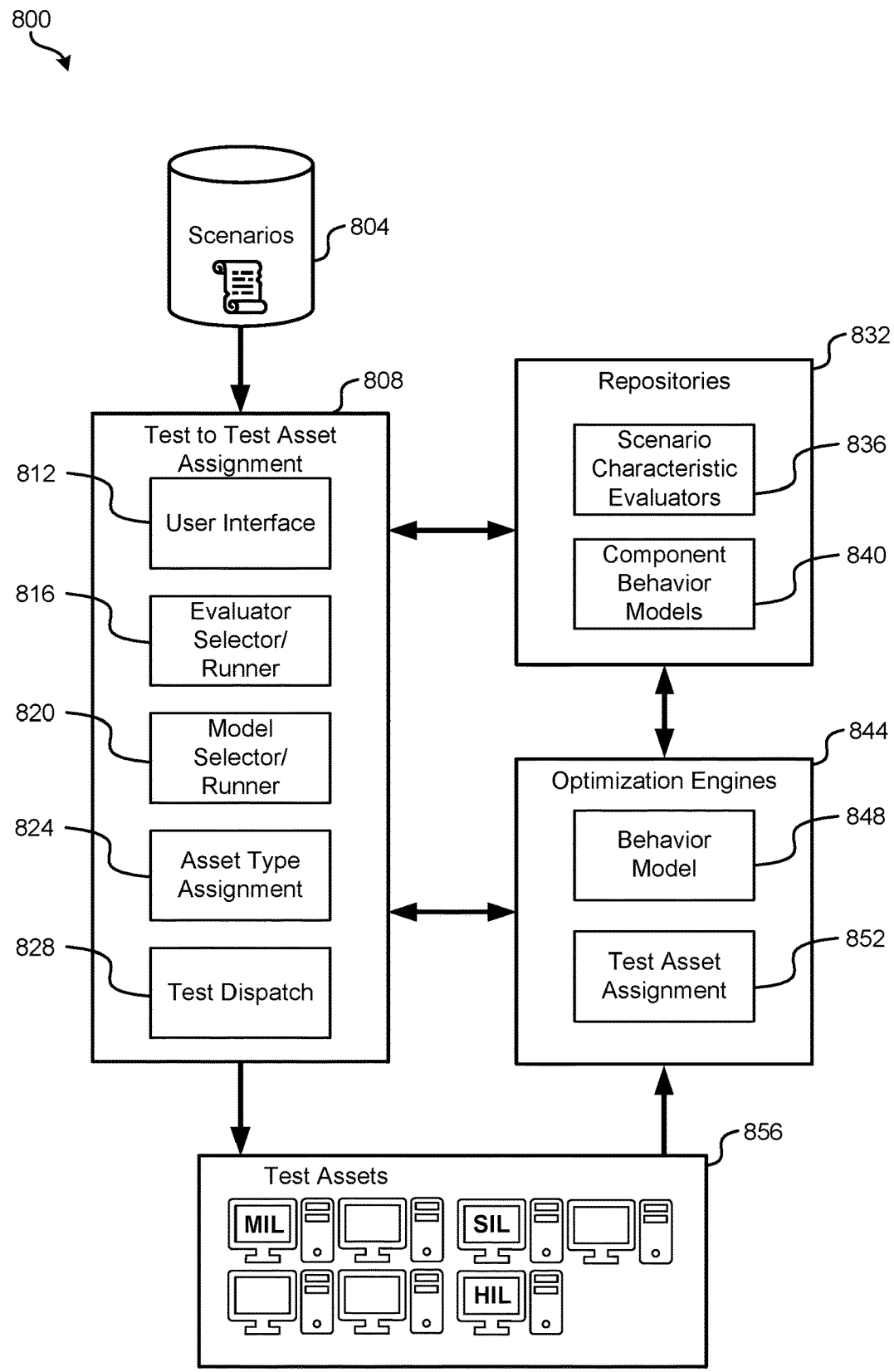
FIG. 8 is an exemplary system diagram for an adaptive test assignment system 800 according to some embodiments.

FIG. 8 is an exemplary system diagram for an adaptive test assignment system 800 according to some embodiments. The functional components of adaptive test assignment system 800 may include test to test asset assignment 808, repositories 832, and optimization engines 844. Adaptive test assignment system 800 may further include, or be in communication with, scenario database 804 and test assets 856. Scenario database 804 may be a local or remote data store including a plurality of scenario-based tests, as described above in relation to scenario-based test 504. Test assets 856 may include one or more test assets configured to execute scenario-based tests from scenario database 804 on SUT proxies.

The functional components of adaptive test assignment system 800 may be installed at a central location or facility, such as a company headquarters, while test assets 856 may be installed across one or more manufacturing and/or testing facilities in a different geographic location. The functional components of adaptive test assignment system 800 may be installed as a single instance running on a computer or as a distributed system running across multiple computers. Additionally, or alternatively, the functional components of adaptive test assignment system 800 may be implemented on one or more computers, servers, mainframes, cloud-based server systems, and the like.

Test to test asset assignment 808 may include user interface module 812, evaluator selector/runner module 816, model selector/runner module 820, asset type assignment module 824, and test dispatch module 828. Each module of test to test asset assignment 808 may be implemented by any one or a combination of a single software application or multiple software applications configured to interface with each other. Test to test asset assignment 808 may further be in communication with repositories 832 and optimization engines 844.

Repositories 832 may include scenario characteristic evaluator repository 836 and component behavior model repository 840. Each repository of repositories 832 may similarly be implemented by any one or a combination of a single software application or multiple software applications configured to interface with each other. Repositories 832 may further include one or more databases or other data stores configured to maintain a structured organization of information and objects, such as one or more lookup tables, maps, trees, and the like.

User interface module 812 may include one or more components configured to receive inputs from, and display outputs to, a user. For example, as described above, user interface module 812 may be configured to receive one or more inputs from a domain expert to: identify the components of an SUT, identify the corresponding components of one or more SUT proxies, identify component behaviors, create corresponding SUT proxy component behavior models, identify scenario characteristics from an SDL, and the like. Additionally, or alternatively, user interface module 812 may be configured to generate outputs, such as on a display interface, indicating: a selected test asset type for a scenario-based test, the results of executing the scenario-based test on a test asset of the selected test asset type, and the like.

As described above in relation to scenario characteristic evaluators 428, scenario characteristic evaluator repository 836 may include one or more lookup tables configured to map scenario characteristics to scenario characteristic evaluators. Evaluator selector/runner module 816 may include one or more components configured to select a scenario characteristic evaluator from scenario characteristic evaluator repository 836 using a scenario characteristic. Evaluator selector/runner module 816 may further include one or more components configured to run a selected scenario characteristic evaluator on a scenario-based test from scenario database 804 to extract a scenario characteristic value, as described further in relation to scenario characteristic values 520 above.

As described above in relation to SUT proxy component behavior models 436, component behavior model repository 840 may include one or more lookup tables mapping SUT component behavior and scenario characteristic tuples to maps of SUT proxy component behavior models. Model selector/runner module 820 may include one or more components configured to identify a plurality of SUT proxy component behavior models from component behavior model repository 840 using a component behavior and scenario characteristic tuple. Model selector/runner module 820 may further include one or more components configured to run each of the identified SUT proxy component behavior models using scenario characteristic values extracted by evaluator selector/runner module 816 from a scenario-based test to generate a plurality of predicted SUT proxy component behavior outcomes.

Asset type assignment module 824 may include one or more components configured to select a test asset type included in test assets 856 using predicted SUT proxy component behavior outcomes generated by model selector/runner module 820. For example, asset type assignment module 824 may include one or more logic-based programs (e.g., software applications), AI/ML models, and the like, configured to select an asset type that optimizes the cost and/or accuracy associated with executing a scenario-based test on a test asset of the selected asset type.

Test dispatch module 828 may include one or more components configured to identify a test asset of test assets 856 based on the selected test asset type from asset type assignment module 824. For example, test dispatch module 828 may be configured to monitor the activity and/or availability levels of test assets 856 to identify an available test asset of the selected asset type. Test dispatch module 828 may be further configured to transmit scenario-based tests from scenario database 804 to test assets 856. For example, test dispatch module 828 may transmit scenario-based tests over one or more wired and/or wireless networks connecting test to test asset assignment 808 with test assets 856.

Optimization engines 844 may include behavior model optimization engine 848 and test asset assignment optimization engine 852. Optimization engines 844 may be configured to receive the results of executing one or more scenario-based tests from test assets 856. For example, optimization engines 844 may receive actual or measured SUT proxy component behavior outcomes and/or measured KPI outcomes from test assets 856. Using the results from test assets 856, behavior model optimization engine 848 may adjust one or more SUT proxy component behavior models stored in component behavior model repository 840 to improve the predictive ability of each corresponding SUT proxy component behavior model, as further described in relation to FIG. 6. Similarly, test asset assignment optimization engine 852 may use the results from test assets 858 to improve the optimizations performed by asset type assignment module 824 in selecting test asset types, as further described above in relation to FIG. 7.

Figure 9:
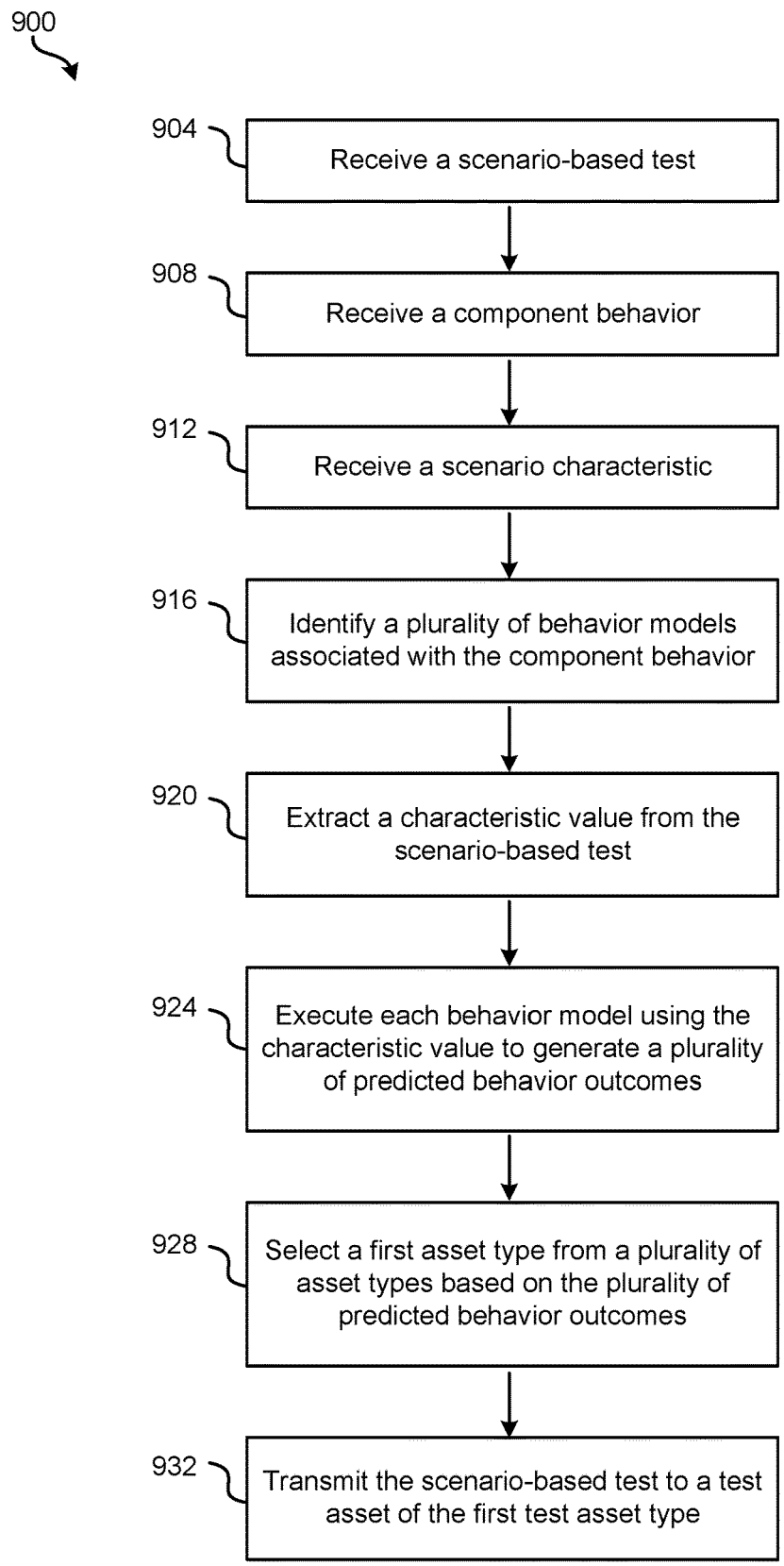
FIG. 9 illustrates an exemplary method of adaptively assigning scenario-defined tests to test assets in an adaptive test assignment system according to some embodiments.

Various methods may be performed using the system and configurations detailed in relation to FIGS. 1-8. FIG. 9 illustrates an exemplary method 900 of adaptively assigning scenario-defined tests to test assets in an adaptive test assignment system according to some embodiments. In some embodiments, method 900 is performed by one or more modules of an adaptive test assignment system, such as adaptive test assignment system 800 as described above. For example, test assignment system 808 and/or one or more of its component modules may perform some or all of method 900. At block 904, a scenario-based test is received. The scenario-based test may be operable to test a KPI of an SUT. The scenario-based test may include a plurality of data fields defined by an SDL, such as SDL 404 described above.

At block 908, a component behavior is received. The component behavior may be an SUT component behavior, as described above, exhibited by a first component of the SUT during testing of the SUT. The first component may exhibit a plurality of component behaviors during testing of the SUT. From the plurality of component behaviors, the component behavior may be selected based on a determination that the KPI is a function of the component behavior. Determining that the KPI is a function of the component behavior may include identifying a correlation coefficient between the KPI and the component behavior. In some embodiments, the SUT includes a plurality of components comprising the first component. Each component of the plurality of components may exhibit a respective plurality of component behaviors during operation of the SUT. In some embodiments, the component behavior is received with a plurality of component behaviors including respective pluralities of component behaviors for each component of the SUT.

At block 912, a scenario characteristic is received. The scenario characteristic may represent a piece or class of information or data discoverable and/or computable from the plurality of data fields included in the scenario-based test. For example, the scenario characteristic may include a definition of a data field indicating a number of vehicles included in the scenario-based test. The component behavior may be a function of the scenario characteristic. For example, a radar sensor may exhibit an SNR behavior that is a function of the number of objects (e.g., vehicles) detected within its field of view. In some embodiments, the component behavior is a further function of a plurality of scenario characteristics including the scenario characteristic. Additionally, or alternatively, the plurality of scenario characteristics may affect other component behaviors of the component, or of other components, of the SUT. In some embodiments, the scenario characteristic is received with the plurality of scenario characteristics. The scenario characteristic may be identified from one or more data fields, rules, schemas, or standards defined by the SDL. For example, scenario characteristics representing the number of vehicles, or an average vehicle size, simulated by one or more scenario-based tests may be identified based on a vehicle object definition in the SDL.

At block 916, a plurality of behavior models associated with the component behavior are identified. Behavior models may represent one or more functions, algorithms, or programs configured to model a behavior of a component given one or more inputs. Similar to component behaviors, behavior models may be a function of one or more scenario characteristics. Each behavior model of the plurality of behavior models may be associated with a corresponding test asset type of a plurality of test asset types. For example, the plurality of behavior models may include a first behavior model for an MIL test asset type, a second behavior model for an SIL test asset type, a third behavior model for an HIL test asset type, and so on for each of the plurality of test asset types.

In some embodiments, the plurality of behavior models may be identified based on the component behavior and the scenario characteristic. For example, using the component behavior and scenario characteristic tuple as a lookup index, a corresponding entry representing a map of behavior models for each test asset type may be identified in a tabular repository of behavior models. As described above, multiple component behaviors and/or scenario characteristics may be received. Accordingly, each unique combination of component behaviors and scenario characteristics may be used to identify a corresponding set or plurality of behavior models.

At block 920, a characteristic value is extracted from the scenario-based test. The characteristic value may be an actual value for the class of data represented by the scenario characteristic. As described above, the characteristic value may be discoverable and/or computable from the plurality of data fields included in the scenario-based test. For example, the characteristic value may be readily identifiable from one or more declarations in the scenario-based test. Additionally, or alternatively, an evaluator may apply one or more mathematical, statistical, and/or logical functions to a plurality of data fields identified in the scenario-based test to compute the characteristic value. For example, to compute an average initial vehicle speed value, a function may add the initial speeds for each vehicle included in the declaration of the vehicle, and divide the resulting number by the number of vehicle declarations observed in the scenario-based test.

At block 924, each behavior model of the plurality of behavior models is executed using the characteristic value to generate a plurality of predicted behavior outcomes. As described above, each behavior model may be configured to model a component's behavior given one or more inputs. The resulting output of each behavior model given the characteristic value may therefore be a prediction of how the actual component would behave during execution of the scenario-based test, otherwise known as a predicted behavior outcome. Each predicted behavior outcome of the plurality of predicted behavior outcomes may be associated with a respective behavior model of the plurality of behavior models, which in turn are associated with a test asset type of the plurality of test asset types. As such, each predicted behavior outcome may be a prediction of how an actual component from each test asset type would behave during execution of the scenario-based test. Each predicted behavior outcome may be represented based on the corresponding manner in which the actual component would exhibit the behavior. For example, predicted behavior outcomes representing the predicted SNR of a radar component may be represented as a single value. Additionally, or alternatively, the predicted behavior outcomes may be expressed as a function, such as a probability density function representing the predicted speed of a vehicle during execution of the scenario-based test.

At block 928, a first asset type is selected from a plurality of asset types based on the plurality of predicted behavior outcomes. As described further above, test assets may be classified according to one of a plurality of types (e.g., MIL, SIL, HIL, etc.). Each type of test asset may include a collection of resources configured to run the scenario-based test on a corresponding functional system modeled after the SUT (e.g., an SUT proxy). Depending on how accurately each SUT proxy is intended to model the SUT, the results of executing the scenario-based test by a test asset of each type may result in corresponding losses in fidelity and/or accuracy compared to the results of executing the scenario-based test on the actual SUT. The plurality of predicted behavior outcomes may represent the predicted loss in fidelity and/or accuracy between test asset types. Similarly, an associated cost of executing the scenario-based test on each SUT proxy may be correlated with the level of accuracy and fidelity produced by each SUT proxy.

Accordingly, the first asset type may be selected to optimize a reduction in cost without a corresponding loss in accuracy and fidelity. For example, by comparing the plurality of predicted behavior outcomes, it may be determined that the difference between the predicted behavior outcomes associated with a lowest cost test asset type and a highest cost test asset type is within an acceptable threshold difference. Therefore, the lowest cost test asset type may be selected to reduce costs without sacrificing the fidelity and/or accuracy associated with the results of executing the scenario-based test by the lowest cost test asset type.

At block 932, the scenario-based test is transmitted to a test asset of the first test asset type. Prior to transmission, the test asset may be selected from a plurality of test assets of the first test asset type based on an availability of each test asset to run the scenario-based test. As described above, the scenario-based test may be transmitted from a test assignment system to the test asset via one or more wired and/or wireless networks. In some embodiments, the test assignment system and the test asset are located in different geographical locations. For example, the test assignment system may be located in a central headquarters while the test asset is located in one of a plurality of manufacturing and testing facilities.

It should be appreciated that the specific steps illustrated in FIG. 9 provide a particular method of adaptively assigning scenario-defined tests to test assets in an adaptive test assignment system according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
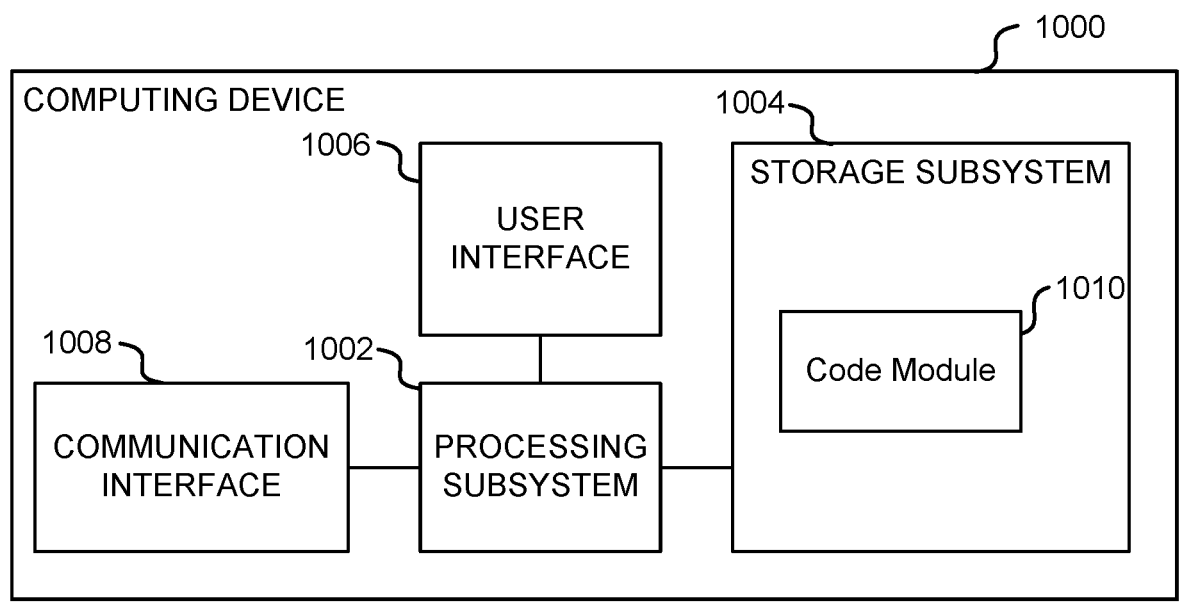
FIG. 10 illustrates a block diagram of an embodiment of a computer system according to some embodiments.

In some embodiments, one or more services of an adaptive test assignment system are implemented on a computing device. FIG. 10 illustrates a block diagram of an embodiment of a computer system according to some embodiments. Computing device 1000 can implement some or all functions, behaviors, and/or capabilities described above that would use electronic storage or processing, as well as other functions, behaviors, or capabilities not expressly described. Computing device 1000 includes a processing subsystem 1002, a storage subsystem 1004, a user interface 1006, and/or a communication interface 1008. Computing device 1000 can also include other components (not explicitly shown) such as a battery, power controllers, and other components operable to provide various enhanced capabilities. In various embodiments, computing device 1000 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1004 can be implemented using a local storage and/or removable storage medium, e.g., using disk, flash memory (e.g., secure digital card, universal serial bus flash drive), or any other non-transitory storage medium, or a combination of media, and can include volatile and/or nonvolatile storage media. Local storage can include random access memory (RAM), including dynamic RAM (DRAM), static RAM (SRAM), or battery backed up RAM. In some embodiments, storage subsystem 1004 can store one or more applications and/or operating system programs to be executed by processing subsystem 1002, including programs to implement some or all operations described above that would be performed using a computer. For example, storage subsystem 1004 can store one or more code modules 1010 for implementing one or more method steps described above.

A firmware and/or software implementation may be implemented with modules (e.g., procedures, functions, and so on). A machine-readable medium tangibly embodying instructions may be used in implementing methodologies described herein. Code modules 1010 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module 1010) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementations of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1010 may comprise sets of instructions (codes) embodied on a computer-readable medium that directs a processor of a computing device 1000 to perform corresponding actions. The instructions may be configured to run in sequential order, in parallel (such as under different processing threads), or in a combination thereof. After loading a code module 1010 on a general purpose computer system, the general purpose computer is transformed into a special purpose computer system.

Computer programs incorporating various features described herein (e.g., in one or more code modules 1010) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 1004 can also store information useful for establishing network connections using the communication interface 1008.

User interface 1006 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 1006 to invoke the functionality of computing device 1000 and can view and/or hear output from computing device 1000 via output devices of user interface 1006. For some embodiments, the user interface 1006 might not be present (e.g., for a process using an ASIC).

Processing subsystem 1002 can be implemented as one or more processors (e.g., integrated circuits, one or more single core or multi core microprocessors, microcontrollers, central processing unit, graphics processing unit, etc.). In operation, processing subsystem 1002 can control the operation of computing device 1000. In some embodiments, processing subsystem 1002 can execute a variety of programs in response to program code and can maintain multiple concurrently executing programs or processes. At a given time, some or all of a program code to be executed can reside in processing subsystem 1002 and/or in storage media, such as storage subsystem 1004. Through programming, processing subsystem 1002 can provide various functionality for computing device 1000. Processing subsystem 1002 can also execute other programs to control other functions of computing device 1000, including programs that may be stored in storage subsystem 1004.

Communication interface 1008 can provide voice and/or data communication capability for computing device 1000. In some embodiments, communication interface 1008 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 1008 can provide wired connectivity (e.g., universal serial bus, Ethernet, universal asynchronous receiver/transmitter, etc.) in addition to, or in lieu of, a wireless interface. Communication interface 1008 can be implemented using a combination of hardware (e.g., driver circuits, antennas, modulators/demodulators, encoders/decoders, and other analog and/or digital signal processing circuits) and software components. In some embodiments, communication interface 1008 can support multiple communication channels concurrently. In some embodiments, the communication interface 1008 is not used.

It will be appreciated that computing device 1000 is illustrative and that variations and modifications are possible. A computing device can have various functionality not specifically described (e.g., voice communication via cellular telephone networks) and can include components appropriate to such functionality.

Further, while the computing device 1000 is described with reference to particular blocks, it is to be understood that these blocks are defined for convenience of description and are not intended to imply a particular physical arrangement of component parts. For example, the processing subsystem 1002, the storage subsystem 1004, the user interface 1006, and/or the communication interface 1008 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 1000.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of assigning scenario-based tests to test assets, the method comprising:
    receiving a scenario-based test operable to test a key performance indicator (KPI) of a System Under Test (SUT);
    receiving a component behavior exhibited by a first component of the SUT during testing of the SUT, wherein the SUT includes a plurality of components comprising the first component;
    receiving a scenario characteristic, wherein the component behavior is a function of the scenario characteristic;
    identifying, based on the component behavior and the scenario characteristic, a first plurality of behavior models associated with the component behavior, wherein each behavior model of the first plurality of behavior models is associated with a corresponding test asset type of a plurality of test asset types;
    extracting, from the scenario-based test and based on the scenario characteristic, a characteristic value of the scenario characteristic;
    executing each behavior model of the first plurality of behavior models using the characteristic value to generate a first plurality of predicted behavior outcomes, wherein each predicted behavior outcome of the first plurality of predicted behavior outcomes is associated with a respective behavior model of the first plurality of behavior models;
    selecting a first test asset type from the plurality of test asset types based on the first plurality of predicted behavior outcomes; and
    transmitting the scenario-based test to a test asset of the first test asset type.

2. The method of claim 1, wherein the scenario-based test comprises a plurality of data fields defined by a scenario description language, and the method further comprises identifying the scenario characteristic from the scenario description language.

3. The method of claim 1, wherein the first component exhibits a plurality of component behaviors during testing of the SUT, the plurality of component behaviors comprising the component behavior, and the method further comprises:
    determining that the KPI is a function of the component behavior; and
    selecting the component behavior from the plurality of component behaviors based on the determination.

4. The method of claim 3, wherein each component behavior of the plurality of component behaviors is associated with a respective plurality of behavior models, and selecting the test asset type from the plurality of test asset types is further based on executions of the respective plurality of behavior models for each component behavior of the plurality of component behaviors.

5. The method of claim 1, wherein:
    each component of the plurality of components exhibits a respective plurality of component behaviors during operation of the SUT;
    a plurality of behavior models are associated with each of the respective plurality of component behaviors; and
    the method further comprises:
        executing each of the plurality of behavior models associated with each of the respective plurality of behaviors; and
        selecting the test asset type from the plurality of test asset types is further based on the execution of each of the plurality of behavior models.

6. The method of claim 1, wherein the component behavior is a further function of a plurality of scenario characteristics, and each behavior model of the first plurality of behavior models is further executed using each scenario characteristic of the plurality of scenario characteristics.

7. The method of claim 1, wherein the plurality of test asset types includes at least one test asset type selected from a model-in-the-loop test asset type, a software-in-the-loop test asset type, or a hardware-in-the-loop test asset type.

8. The method of claim 1, wherein each behavior model is further associated with a respective proxy component of the corresponding test asset type and is configured to generate a predicted behavior outcome for the proxy component given the characteristic value.

9. The method of claim 1, further comprising:
    executing, by the test asset, the scenario-based test on an SUT proxy; and
    measuring, by the test asset, a KPI outcome for the KPI during execution of the scenario-based test on the SUT proxy.

10. The method of claim 1, further comprising receiving, from the test asset, an actual behavior outcome exhibited by a proxy component corresponding to the first component of the SUT during an execution of the scenario-based test by the test asset.

11. The method of claim 10, wherein the test asset type corresponds with a first behavior model of the first plurality of behavior models, and the method further comprises:
    adjusting the first behavior model based on a difference between the actual behavior outcome and a predicted behavior outcome of the first behavior model generated using the characteristic value.

12. The method of claim 10, wherein selecting the test asset type from the plurality of test asset types is further based on a threshold difference between predicted behavior outcomes, and the method further comprises:
    receiving, from the test asset, a KPI outcome for the KPI measured during an execution of the scenario-based test by the test asset;
    identifying a correlation between the KPI outcome and the component behavior based on the actual behavior outcome exhibited by the proxy component; and
    adjusting the threshold difference based on the identified correlation between the KPI outcome and the component behavior.

13. An adaptive test assignment system, the system comprising:
one or more processors; and
one or more memories storing computer-readable instructions that, upon execution by the one or more processors, configure the system to:
receive a scenario-based test operable to test a key performance indicator (KPI) of a System Under Test (SUT);
receive a component behavior exhibited by a first component of the SUT during testing of the SUT, wherein the SUT includes a plurality of components comprising the first component;
receive a scenario characteristic, wherein the component behavior is a function of the scenario characteristic;
identify, based on the component behavior and the scenario characteristic, a first plurality of behavior models associated with the component behavior, wherein each behavior model of the first plurality of behavior models is associated with a corresponding test asset type of a plurality of test asset types;
extract, from the scenario-based test and based on the scenario characteristic, a characteristic value of the scenario characteristic;
execute each behavior model of the first plurality of behavior models using the characteristic value to generate a first plurality of predicted behavior outcomes, wherein each predicted behavior outcome of the first plurality of predicted behavior outcomes is associated with a respective behavior model of the first plurality of behavior models;
select a first test asset type from the plurality of test asset types based on the first plurality of predicted behavior outcomes; and
transmit the scenario-based test to a test asset of the first test asset type.

14. The adaptive test assignment system of claim 13, further comprising a plurality of test assets comprising the test asset and in communication with the one or more processors, wherein each test asset of the plurality of test assets is assigned a respective test asset type from the plurality of test asset types, and wherein, in response to receiving the scenario-based test, the test asset is configured to perform operations comprising:
executing the scenario-based test on an SUT proxy;
measuring a KPI outcome for the KPI as a result of executing the scenario-based test on the SUT proxy; and
measuring an actual behavior outcome exhibited by a proxy component of the SUT proxy corresponding to the first component of the SUT.

15. The adaptive test assignment system of claim 14, further comprising a plurality of SUT proxies comprising the SUT proxy, wherein each SUT proxy of the plurality of SUT proxies is assigned to a respective test asset of the plurality of test assets.

16. The adaptive test assignment system of claim 14, further comprising a communication network communicatively connecting the one or more processors to the plurality of test assets, wherein the one or more processors and the plurality of test assets are located in different geographic locations.

17. One or more non-transitory computer-readable storage media storing instructions that, upon execution on a computer system, cause the computer system to perform operations including:
receiving a scenario-based test operable to test a key performance indicator (KPI) of a System Under Test (SUT);
receiving a component behavior exhibited by a first component of the SUT during testing of the SUT, wherein the SUT includes a plurality of components comprising the first component;
receiving a scenario characteristic, wherein the component behavior is a function of the scenario characteristic;
identifying, based on the component behavior and the scenario characteristic, a first plurality of behavior models associated with the component behavior, wherein each behavior model of the first plurality of behavior models is associated with a corresponding test asset type of a plurality of test asset types;
extracting, from the scenario-based test and based on the scenario characteristic, a characteristic value of the scenario characteristic;
executing each behavior model of the first plurality of behavior models using the characteristic value to generate a first plurality of predicted behavior outcomes, wherein each predicted behavior outcome of the first plurality of predicted behavior outcomes is associated with a respective behavior model of the first plurality of behavior models;
selecting a first test asset type from the plurality of test asset types based on the first plurality of predicted behavior outcomes; and
transmitting the scenario-based test to a test asset of the first test asset type.

18. The one or more non-transitory computer-readable storage media of claim 17, wherein the first component exhibits a plurality of component behaviors during testing of the SUT, the plurality of component behaviors comprising the component behavior, and the operations further include:
calculating a correlation coefficient for the KPI and the component behavior; and
adjusting an importance of the component behavior for subsequent test asset type selections.

19. The one or more non-transitory computer-readable storage media of claim 17, wherein:
each component of the plurality of components exhibits a respective plurality of component behaviors during operation of the SUT;
a plurality of behavior models are associated with each of the respective plurality of component behaviors; and
the operations further include:
executing each of the plurality of behavior models associated with each of the respective plurality of behaviors; and
selecting the test asset type from the plurality of test asset types is further based on the execution of each of the plurality of behavior models.

20. The one or more non-transitory computer-readable storage media of claim 17, wherein the component behavior is a further function of a plurality of scenario characteristics, and each behavior model of the first plurality of behavior models is further executed using each scenario characteristic of the plurality of scenario characteristics.

* * * * *